United States Patent
Nakano et al.

(10) Patent No.: US 10,062,416 B2
(45) Date of Patent: Aug. 28, 2018

(54) IMAGE DECODING DEVICE, AND IMAGE DECODING METHOD, IMAGE ENCODING DEVICE, AND IMAGE ENCODING METHOD

(71) Applicant: Sony Corporation, Tokyo (JP)

(72) Inventors: Takehiko Nakano, Kanagawa (JP); Mitsuhiro Hirabayashi, Tokyo (JP); Mitsuru Katsumata, Tokyo (JP); Satoshi Tsujii, Tokyo (JP); Teruhiko Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 158 days.

(21) Appl. No.: 14/412,480

(22) PCT Filed: May 10, 2013

(86) PCT No.: PCT/JP2013/063178
§ 371 (c)(1),
(2) Date: Jan. 2, 2015

(87) PCT Pub. No.: WO2014/010300
PCT Pub. Date: Jan. 16, 2014

(65) Prior Publication Data
US 2015/0194188 A1    Jul. 9, 2015

(30) Foreign Application Priority Data

Jul. 10, 2012 (JP) ................. 2012-154557

(51) Int. Cl.
*G11B 27/22* (2006.01)
*H04N 5/783* (2006.01)
(Continued)

(52) U.S. Cl.
CPC ............. *G11B 27/22* (2013.01); *G11B 19/12* (2013.01); *G11B 20/00007* (2013.01);
(Continued)

(58) Field of Classification Search
CPC ... G11B 27/22; G11B 19/12; G11B 20/00007; G11B 27/3027
(Continued)

(56) References Cited

U.S. PATENT DOCUMENTS

2003/0188182 A1\* 10/2003 Sato ........................ H04N 5/783
  713/193
2010/0014666 A1\* 1/2010 Park ..................... H04N 7/1675
  380/210
(Continued)

FOREIGN PATENT DOCUMENTS

JP    2014-011572    1/2014

OTHER PUBLICATIONS

Benjamin Bross, et al., High Efficiency Video Coding (HEVC) text specification draft 6, Joint Collaborative Team on Video Coding (JCT-VC) of ITU-T SG16 WP3 and ISO/IEC JTC1/SC29/WG11, Nov. 21-30, 2011, pp. 1-251, 7th Meeting: Geneva, CH.

(Continued)

*Primary Examiner* — Mishawn Hunter
(74) *Attorney, Agent, or Firm* — Paratus Law Group, PLLC

(57) ABSTRACT

Provided is an image decoding device including an acquisition unit configured to acquire clean random access (CRA) information used to identify one or more CRA pictures in an image sequence inserted into a data region from a header region of a file format including the header region and the data region, a control unit configured to specify one CRA picture in the image sequence as a decoding start picture using the CRA information when an instruction of random access is detected, and a decoding unit configured to decode the image sequence from the decoding start picture specified by the control unit.

15 Claims, 33 Drawing Sheets

(51) Int. Cl.
| | |
|---|---|
| *H04N 9/804* | (2006.01) |
| *H04N 21/432* | (2011.01) |
| *H04N 21/472* | (2011.01) |
| *H04N 21/845* | (2011.01) |
| *H04N 21/854* | (2011.01) |
| *G11B 19/12* | (2006.01) |
| *G11B 20/00* | (2006.01) |
| *G11B 27/30* | (2006.01) |
| *G11B 27/34* | (2006.01) |

(52) U.S. Cl.
CPC ...... *G11B 27/3027* (2013.01); *G11B 27/3081* (2013.01); *G11B 27/34* (2013.01); *H04N 5/783* (2013.01); *H04N 9/8042* (2013.01); *H04N 21/4325* (2013.01); *H04N 21/47217* (2013.01); *H04N 21/8451* (2013.01); *H04N 21/85406* (2013.01); *G11B 2020/00072* (2013.01)

(58) Field of Classification Search
USPC .......................................... 386/239, 241, 248
See application file for complete search history.

(56) References Cited

U.S. PATENT DOCUMENTS

| | | | | |
|---|---|---|---|---|
| 2012/0185570 | A1* | 7/2012 | Bouazizi | H04N 21/44016 709/219 |
| 2012/0230433 | A1* | 9/2012 | Chen | H04N 19/503 375/240.25 |
| 2012/0259994 | A1* | 10/2012 | Gillies | H04L 12/1881 709/231 |
| 2013/0064284 | A1* | 3/2013 | Samuelsson | H04N 19/70 375/240.01 |
| 2013/0089152 | A1* | 4/2013 | Wang | H04N 19/00951 375/240.23 |
| 2013/0272430 | A1* | 10/2013 | Sullivan | H04N 19/70 375/240.26 |
| 2013/0279599 | A1* | 10/2013 | Wang | H04N 19/00139 375/240.25 |

OTHER PUBLICATIONS

Ye-Kui Wang, Report of the BoG on clean random access (CRA) picture, Joint Collaborative Team on Video Coding (JCT-VC) of ITU-T SG16 WP3 and ISO/IEC JTC1/SC29/WG11, Jul. 14-22, 2011, pp. 1-3, 6th Meeting: Torino, IT.

TK Tan, Clean decoding refresh definition and decoding process, Joint Collaborative Team on Video Coding (JCT-VC) of ITU-T SG16 WP3 and ISO/IEC JTC1/SC29/WG11, Jul. 14-22, 2011, pp. 1-3, 6$^{th}$ Meeting: Torino, IT.

Jun. 20, 2017, JP communication issued for JP related application No. 2014-524678.

Deshpande, et al., Signaling of CRA Pictures, Joint Collaborative Team on Video Coding (JCT-VC) of ITU-T SG16 WP3 and ISO/IEC JTC1/SC29/WG11, 9$^{th}$ Meeting, Apr. 27-May 7, 2012, pp. 1-4, Geneva, Switzerland.

Wang, on allocation of NAL unit types, Joint Collaborative Team on Video Coding (JCT-VC) of ITU-T SG16 WP3 and ISO/IEC JTC1/SC29/WG11, 9$^{th}$ Meeting, Apr. 27-May 7, 2012, pp. 1-4, Geneva, CH.

* cited by examiner

FIG.4

CRA INFORMATION EXAMPLE (1-1) FOR Non-Fragmented Movie

```
1  aligned(8) class CRASampleBox extends FullBox('stcs', version = 0, 0) {
2      unsigned int(32) entry_count;
3      int i;
4      for (i=0; i < entry_count; i++) {
5          unsigned int(32) sample_number;
6      }
7  }
```

FIG.5

CRA INFORMATION EXAMPLE (1-2) FOR Non-Fragmented Movie

```
1  aligned(8) class CRASampleBox extends FullBox('stcs', version = 0, 0) {
2    unsigned int(32) entry_count;
3    int i;
4    for (i=0; i < entry_count; i++) {
5      unsigned int(32) sample_number;
6      int(8) broken_samples;
7    }
8  }
```

FIG.6

CRA INFORMATION EXAMPLE (1-3) FOR Non-Fragmented Movie

```
1  aligned(8) class CRASampleBox extends FullBox('stcs', version = 0, 0) {
2      unsigned int(32) entry_count;
3      int i;
4      for (i=0; i < entry_count; i++) {
5          unsigned int(32) sample_number;
6          int(32) broken_duration;
7      }
8  }
```

FIG.7

CRA INFORMATION EXAMPLE (2-1) FOR Non-Fragmented Movie

```
1  aligned(8) class RandomAccessSampleBox extends FullBox('stra', version = 0, 0) {
2      unsigned int(32) entry_count;
3      int i;
4      for (i=0; i < entry_count; i++) {
5          unsigned int(8) sample_type;
6          unsigned int(32) sample_number;
7      }
8  }
```

FIG.8

CRA INFORMATION EXAMPLE (2-2) FOR Non-Fragmented Movie

```
1  aligned(8) class RandomAccessSampleBox extends FullBox('stra', version = 0, 0) {
2    unsigned int(32) entry_count;
3    int i;
4    for (i=0; i < entry_count; i++) {
5      unsigned int(8) sample_type;
6      unsigned int(32) sample_number;
7      int(8) broken_samples;
8    }
9  }
```

FIG.9

CRA INFORMATION EXAMPLE (2-3) FOR Non-Fragmented Movie

```
1  aligned(8) class RandomAccessSampleBox extends FullBox('stra', version = 0, 0) {
2     unsigned int(32) entry_count;
3     int i;
4     for (i=0; i < entry_count; i++) {
5        unsigned int(8) sample_type;
6        unsigned int(32) sample_number;
7        int(32) broken_duration;
8     }
9  }
```

FIG.10

CRA INFORMATION EXAMPLE (3-1) FOR Fragmented Movie

```
1   aligned(8) class TrackFragmentCRAAccessBox extends FullBox('tfca', version, 0) {
2       unsigned int(32) track_ID;
3       const unsigned int(26) reserved = 0;
4       unsigned int(2) length_size_of_traf_num;
5       unsigned int(2) length_size_of_trun_num;
6       unsigned int(2) length_size_of_sample_num;
7       unsigned int(32) number_of_entry;
8       for(i=1; i <= number_of_entry; i++){
9           if(version==1){
10              unsigned int(64) time;
11              unsigned int(64) moof_offset;
12          }else{
13              unsigned int(32) time;
14              unsigned int(32) moof_offset;
15          }
16          unsigned int((length_size_of_traf_num+1) * 8) traf_number;
17          unsigned int((length_size_of_trun_num+1) * 8) trun_number;
18          unsigned int((length_size_of_sample_num+1) * 8) sample_number;
19      }
20  }
```

FIG. 11

CRA INFORMATION EXAMPLE (3-2) FOR Fragmented Movie

```
1   aligned(8) class TrackFragmentCRAAccessBox extends FullBox('tfca', version, 0) {
2       unsigned int(32) track_ID;
3       const unsigned int(26) reserved = 0;
4       unsigned int(2) length_size_of_traf_num;
5       unsigned int(2) length_size_of_trun_num;
6       unsigned int(2) length_size_of_sample_num;
7       unsigned int(32) number_of_entry;
8       for(i=1; i <= number_of_entry; i++){
9           if(version==1){
10              unsigned int(64) time;
11              unsigned int(64) moof_offset;
12          }else{
13              unsigned int(32) time;
14              unsigned int(32) moof_offset;
15          }
16          unsigned int((length_size_of_traf_num+1) * 8) traf_number;
17          unsigned int((length_size_of_trun_num+1) * 8) trun_number;
18          unsigned int((length_size_of_sample_num+1) * 8) sample_number;
19          int(8) preceding_samples;
20      }
21  }
```

FIG.12

CRA INFORMATION EXAMPLE (3-3) FOR Fragmented Movie

```
1   aligned(8) class TrackFragmentCRAAccessBox extends FullBox('tfca', version, 0) {
2       unsigned int(32) track_ID;
3       const unsigned int(26) reserved = 0;
4       unsigned int(2) length_size_of_traf_num;
5       unsigned int(2) length_size_of_trun_num;
6       unsigned int(2) length_size_of_sample_num;
7       unsigned int(32) number_of_entry;
8       for(i=1; i <= number_of_entry; i++){
9           if(version==1){
10              unsigned int(64) time;
11              unsigned int(64) moof_offset;
12          }else{
13              unsigned int(32) time;
14              unsigned int(32) moof_offset;
15          }
16          unsigned int((length_size_of_traf_num+1) * 8) traf_number;
17          unsigned int((length_size_of_trun_num+1) * 8) trun_number;
18          unsigned int((length_size_of_sample_num+1) * 8) sample_number;
19          int(8) preceding_duration;
20      }
21  }
```

FIG. 13

```
CRA INFORMATION EXAMPLE (4-1) FOR Fragmented Movie
1   aligned(8) class ExtTrackFragmentRandomAccessBox extends FullBox('tfr2', version, 0) {
2       unsigned int(32) track_ID;
3       const unsigned int(26) reserved = 0;
4       unsigned int(2) length_size_of_traf_num;
5       unsigned int(2) length_size_of_trun_num;
6       unsigned int(2) length_size_of_sample_num;
7       unsigned int(32) number_of_entry;
8       for(i=1; i <= number_of_entry; i++){
9           if(version==1){
10              unsigned int(64) time;
11              unsigned int(64) moof_offset;
12          }else{
13              unsigned int(32) time;
14              unsigned int(32) moof_offset;
15          }
16          unsigned int((length_size_of_traf_num+1) * 8) traf_number;
17          unsigned int((length_size_of_trun_num+1) * 8) trun_number;
18          unsigned int(8) sample_type;
19          unsigned int((length_size_of_sample_num+1) * 8) sample_number;
20      }
21  }
```

FIG.14

CRA INFORMATION EXAMPLE (4-2) FOR Fragmented Movie

```
1   aligned(8) class ExtTrackFragmentRandomAccessBox extends FullBox('tfr2', version, 0) {
2       unsigned int(32) track_ID;
3       const unsigned int(26) reserved = 0;
4       unsigned int(2) length_size_of_traf_num;
5       unsigned int(2) length_size_of_trun_num;
6       unsigned int(2) length_size_of_sample_num;
7       unsigned int(32) number_of_entry;
8       for(i=1; i <= number_of_entry; i++){
9           if(version==1){
10              unsigned int(64) time;
11              unsigned int(64) moof_offset;
12          }else{
13              unsigned int(32) time;
14              unsigned int(32) moof_offset;
15          }
16          unsigned int((length_size_of_traf_num+1) * 8) traf_number;
17          unsigned int((length_size_of_trun_num+1) * 8) trun_number;
18          unsigned int(8) sample_type;
19          unsigned int((length_size_of_sample_num+1) * 8) sample_number;
20          int(8) preceding_samples;
21      }
22  }
```

FIG.15

CRA INFORMATION EXAMPLE (4-3) FOR Fragmented Movie

```
1   aligned(8) class ExtTrackFragmentRandomAccessBox extends FullBox('tfr2', version, 0) {
2       unsigned int(32) track_ID;
3       const unsigned int(26) reserved = 0;
4       unsigned int(2) length_size_of_traf_num;
5       unsigned int(2) length_size_of_trun_num;
6       unsigned int(2) length_size_of_sample_num;
7       unsigned int(32) number_of_entry;
8       for(i=1; i <= number_of_entry; i++){
9           if(version==1){
10              unsigned int(64) time;
11              unsigned int(64) moof_offset;
12          }else{
13              unsigned int(32) time;
14              unsigned int(32) moof_offset;
15          }
16          unsigned int((length_size_of_traf_num+1) * 8) traf_number;
17          unsigned int((length_size_of_trun_num+1) * 8) trun_number;
18          unsigned int(8) sample_type;
19          unsigned int((length_size_of_sample_num+1) * 8) sample_number;
20          int(8) preceding_duration;
21      }
22  }
```

FIG.16

BASIC SAMPLE GROUP INFORMATION

```
1  aligned(8) class SampleToGroupBox extends FullBox('sbgp', version, )
2  {
3      unsigned int(32)   grouping_type ;
4      if (version == 1) {
5          unsigned int(32) grouping_type_parameter;
6      }
7      unsigned int(32)   entry_count ;
8      for (i=1; i <= entry_count; i++)
9      {
10         unsigned int(32)   sample_count ;
11         unsigned int(32)   group_description_index;
12     }
13 }
```

FIG.17

```
1   aligned(8) class SampleGroupDescriptionBox (unsigned int(32) handler_type)
2     extends FullBox('sgpd', version, 0){
3     unsigned int(32) grouping_type;
4     if (version==1) { unsigned int(32) default_length; }
5     unsigned int(32) entry_count;
6     int i;
7     for (i = 1 ; i <= entry_count ; i++){
8       if (version==1) {
9         if (default_length==0) { unsigned int(32) description_length; }
10      }
11      switch (handler_type){
12        case 'vide': // for video tracks
13          VisualSampleGroupEntry (grouping_type);
14          break;
15        case 'soun': // for audio tracks
16          AudioSampleGroupEntry(grouping_type);
17          break;
18        case 'hint': // for hint tracks
19          HintSampleGroupEntry(grouping_type);
20          break;
21      }
22    }
23  }
```

FIG.18

DEDICATED SAMPLE GROUP (5-1) FOR CRA INFORMATION

| 1 | class CRAEntry() extends VisualSampleGroupEntry ('crap') |
| 2 | { |
| 3 |    unsigned int(8) reserved; |
| 4 | } |

FIG.19

DEDICATED SAMPLE GROUP (5-2) FOR CRA INFORMATION

| 1 | class CRAPointEntry() extends VisualSampleGroupEntry ('crap') |
| 2 | { |
| 3 |    int(8) broken_samples; |
| 4 | } |

FIG.20

DEDICATED SAMPLE GROUP (5-3) FOR CRA INFORMATION

| 1 | class CRAPointEntry() extends VisualSampleGroupEntry ('crap') |
| 2 | { |
| 3 |    int(8) broken_duration; |
| 4 | } |

FIG.21

SHARED SAMPLE GROUP (5-4)

```
1  class ExtRAPEntry() extends VisualSampleGroupEntry ('rap2')
2  {
3      unsigned int(8) sample_type;
4  }
```

FIG.22

SHARED SAMPLE GROUP (5-5)

```
1  class ExtRAPEntry() extends VisualSampleGroupEntry ('rap2')
2  {
3      unsigned int(8) sample_type;
4      int(8) broken_samples;
5  }
```

FIG.23

SHARED SAMPLE GROUP (5-6)

```
1  class ExtRAPEntry() extends VisualSampleGroupEntry ('rap2')
2  {
3      unsigned int(8) sample_type;
4      int(8) broken_duration;
5  }
```

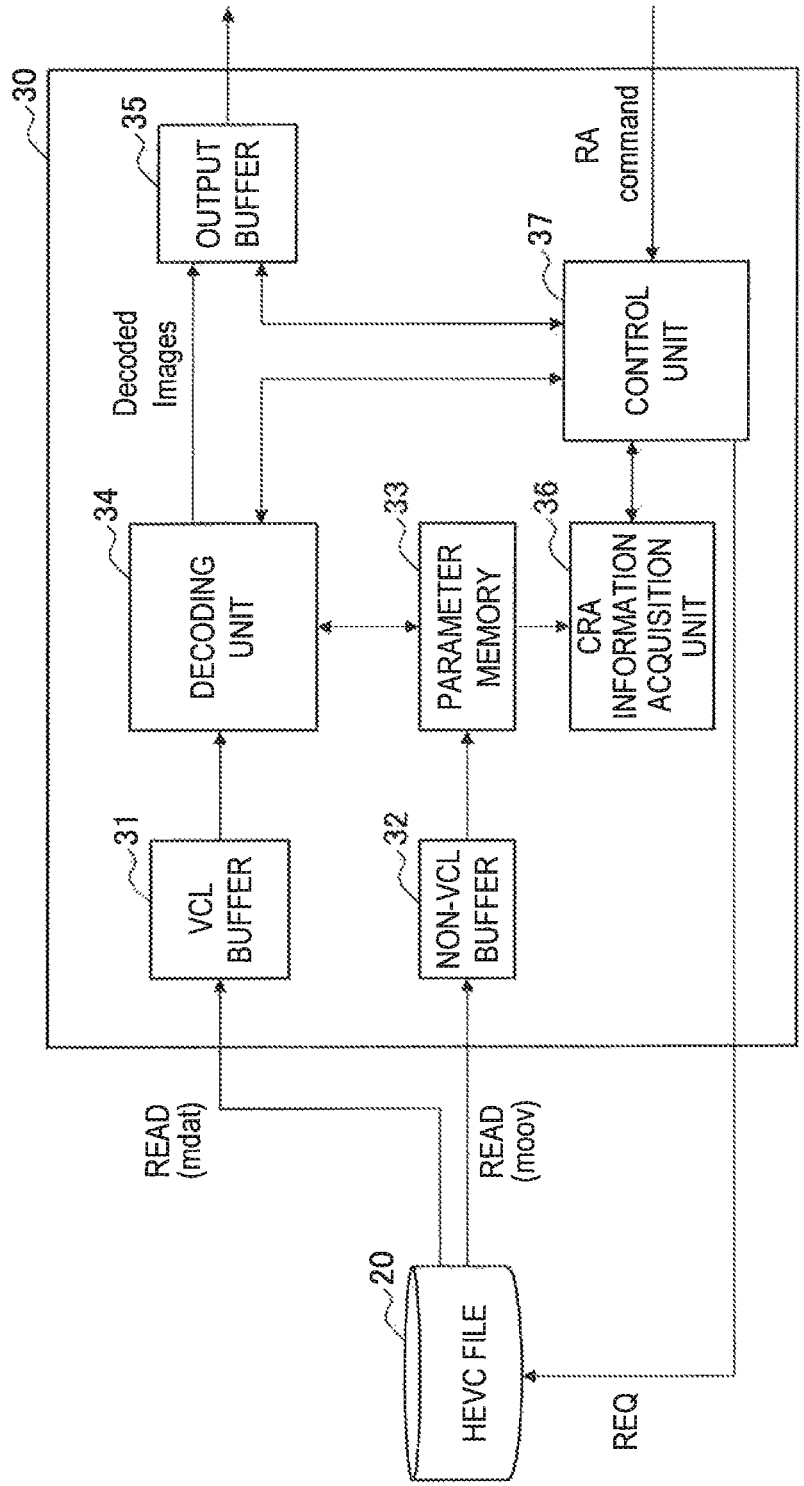

IMAGE DECODING DEVICE, AND IMAGE DECODING METHOD, IMAGE ENCODING DEVICE, AND IMAGE ENCODING METHOD

CROSS REFERENCE TO PRIOR APPLICATION

This application is a National Stage Patent Application of PCT International Patent Application No. PCT/JP2013/063178 (filed on May 10, 2013) under 35 U.S.C. § 371, which claims priority to Japanese Patent Application No. 2012-154557 (filed on Jul. 10, 2012), which are all hereby incorporated by reference in their entirety.

TECHNICAL FIELD

The present disclosure relates to an image decoding device, an image decoding method, an image encoding device, and an encoding method.

BACKGROUND ART

In H.264/AVC, which is one of the standard specifications of image coding schemes, individual images (pictures) are partitioned into one or more slices. Each of the slices is classified as one of an I slice (Intra Slice), a P slice (Predictive Slice), and a B slice (Bi-predictive Slice). An I slice is a slice which is independently decoded without referring to another image. A P slice is a slice which is decoded by referring to another single image. A B slice is a slice which is decoded by referring to a plurality of other images. A beginning picture of a sequence including only an I slice is called an IDR (Instantaneous Decoding Refresh) picture. An IDR picture is identified with a value of an NAL (Network Abstraction Layer) unit type. A picture subsequent to an IDR picture in the same sequence is located only after the IDR picture in presentation order without referring to a picture previous to the IDR picture in a decoding order. Accordingly, when random access (not decoding from the beginning of the stream but decoding/reproduction from the middle of a stream) is attempted at a time point of the middle of a video of a certain encoded stream, a video can be appropriately decoded from an IDR picture in the proximity of a designated time point.

In standardization of HEVC (High Efficiency Video Coding) which is next-generation image coding scheme subsequent to H.264/AVC, a technology for identifying a picture CRA (Clean Random Access) picture with a value of an NAL unit type has been suggested apart from an IDR picture. A CRA picture is a picture including only an I slice in the middle of a sequence. A picture subsequent to a CRA picture in both of a decoding order and a presentation order does not refer to either of a picture previous to the CRA picture in the decoding order or a picture previous to the CRA picture in the presentation order (see Non-Patent Literature 2 below). Accordingly, when random access (decoding of a video from the CRA picture) to the CRA picture at a time point of the middle of a video is attempted, a process of decoding a picture subsequent to the CRA picture in the presentation order can be performed without failure.

CITATION LIST

Non-Patent Literature

Non-Patent Literature 1: Benjamin Bross, Woo-Jin Han, Jens-Rainer Ohm, Gary J. Sullivan, Thomas Wiegand, "High efficiency video coding (HEVC) text specification draft 6" (JCTVC-H1003 ver20, Feb. 17, 2012)

Non-Patent Literature 2: Ye-Kui Wang, "Report of the BoG on clean random access (CRA) picture," JCTVC-F759, Jul. 14 to 22, 2011

SUMMARY OF INVENTION

Technical Problem

While only one IDR picture is present in the beginning of a sequence, a plurality of CRA pictures can be present in the middle of a sequence. Accordingly, introduction of the CRA pictures means that randomly accessible points of a video increase. Accordingly, there is a potential of convenience for a user being considerably improved in terms of uses of reproduction or editing of a video. In known file formats by which encoded streams encoded in conformity with the HEVC scheme are stored, however, information elements efficiently supporting random access to the CRA pictures have not been defined. For example, in MPEG-4 Part 14 (ISO/TEC 14496-14: 2003: hereinafter referred to as MP4) format, unless an NAL unit type of each sample in a chunk stored in a data region (mdat box) is referred to, it may be difficult to identify which picture is a CRA picture. This may result in an excess process cost for random access to the CRA picture.

Accordingly, it is desirable to provide a file format efficiently supporting random access to a CRA picture.

Solution to Problem

According to the present disclosure, there is provided an image decoding device including an acquisition unit configured to acquire CRA information used to identify one or more CRA pictures in an image sequence inserted into a data region from a header region of a file format including the header region and the data region, a control unit configured to specify one CRA picture in the image sequence as a decoding start picture using the CRA information when an instruction of random access is detected, and a decoding unit configured to decode the image sequence from the decoding start picture specified by the control unit.

Further, according to the present disclosure, there is provided an image decoding method including acquiring CRA information used to identify one or more CRA pictures in an image sequence inserted into a data region from a header region of a file format including the header region and the data region, specifying one CRA picture in the image sequence as a decoding start picture using the CRA information when an instruction of random access is detected, and decoding the image sequence from the specified decoding start picture.

Further, according to the present disclosure, there is provided an image encoding device including an encoding unit configured to encode an image in an image sequence and generate image data, a determination unit configured to determine one or more CRA pictures usable as a decoding start picture at a time of random access in the image sequence, and a file generation unit configured to insert CRA information used to identify the one or more CRA pictures determined by the determination unit into a header region of a file format including the header region and a data region and to insert the image data into the data region.

Further, according to the present disclosure, there is provided an image encoding method including encoding an image in an image sequence and generating image data, determining one or more clean random access (CRA) pictures usable as a decoding start picture at a time of random access in the image sequence, and inserting CRA information used to identify the determined one or more CRA pictures into a header region of a file format including the header region and a data region, and inserting the image data into the data region.

Advantageous Effects of Invention

According to the technology in the present disclosure, it is possible to realize random access to a CRA picture more simply than known schemes.

BRIEF DESCRIPTION OF DRAWINGS

FIG. 4 is an explanatory diagram illustrating a first example of a dedicated box for CRA information regarding a Non-Fragmented Movie.

FIG. 5 is an explanatory diagram illustrating a second example of a dedicated box for CRA information regarding a Non-Fragmented Movie.

FIG. 6 is an explanatory diagram illustrating a third example of a dedicated box for CRA information regarding a Non-Fragmented Movie.

FIG. 7 is an explanatory diagram illustrating a first example of a shared box for random access information regarding a Non-Fragmented Movie.

FIG. 8 is an explanatory diagram illustrating a second example of a shared box for random access information regarding a Non-Fragmented Movie.

FIG. 9 is an explanatory diagram illustrating a third example of a shared box for random access information regarding a Non-Fragmented Movie.

FIG. 10 is an explanatory diagram illustrating a first example of a dedicated box for CRA information regarding a Fragmented Movie.

FIG. 11 is an explanatory diagram illustrating a second example of a dedicated box for CRA information regarding a Fragmented Movie.

FIG. 12 is an explanatory diagram illustrating a third example of a dedicated box for CRA information regarding a Fragmented Movie.

FIG. 13 is an explanatory diagram illustrating a first example of a shared box for random access information regarding a Fragmented Movie.

FIG. 14 is an explanatory diagram illustrating a second example of a shared box for random access information regarding a Fragmented Movie.

FIG. 15 is an explanatory diagram illustrating a third example of a shared box for random access information regarding a Fragmented Movie.

FIG. 16 is a first explanatory diagram illustrating a box for basic sample group information.

FIG. 17 is a second explanatory diagram illustrating a box for basic sample group information.

FIG. 18 is an explanatory diagram illustrating a first example of definition of a sample group grouping CRA pictures.

FIG. 19 is an explanatory diagram illustrating a second example of definition of a sample group grouping CRA pictures.

FIG. 20 is an explanatory diagram illustrating a third example of definition of a sample group grouping CRA pictures.

FIG. 21 is an explanatory diagram illustrating a fourth example of definition of a sample group grouping CRA pictures.

FIG. 22 is an explanatory diagram illustrating a fifth example of definition of a sample group grouping CRA pictures.

FIG. 23 is an explanatory diagram illustrating a sixth example of definition of a sample group grouping CRA pictures.

FIG. 24 is a block diagram illustrating an example of the configuration of an image decoding device according to the embodiment.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description will be made in the following order.
1. Example of Configuration of Image Encoding Device According to Embodiment
2. Example of CRA Information
2-1. Dedicated Box for CRA Information (Non-Fragmented Movie)
2-2. Shared Box for Random Access Information (Non-Fragmented Movie)

2-3. Dedicated Box for CRA information (Fragmented Movie)
2-4. Shared Box for Random Access Information (Fragmented Movie)
2-5. Utilization of Sample Group
3. Example of Configuration of image Decoding Device According to Embodiment
4. Flow of Decoding Process
4-1. Decoding Process for Non-Fragmented Movie
4-2. Decoding Process for Fragmented Movie
5. Example Application
6. Conclusion

1. EXAMPLE OF CONFIGURATION OF IMAGE ENCODING DEVICE ACCORDING TO EMBODIMENT

In this section, an image encoding device recording image data encoded in conformity with an HEVC scheme in a moving image file with a new file format supporting random access to a CRA picture will be described.

Figure 1:
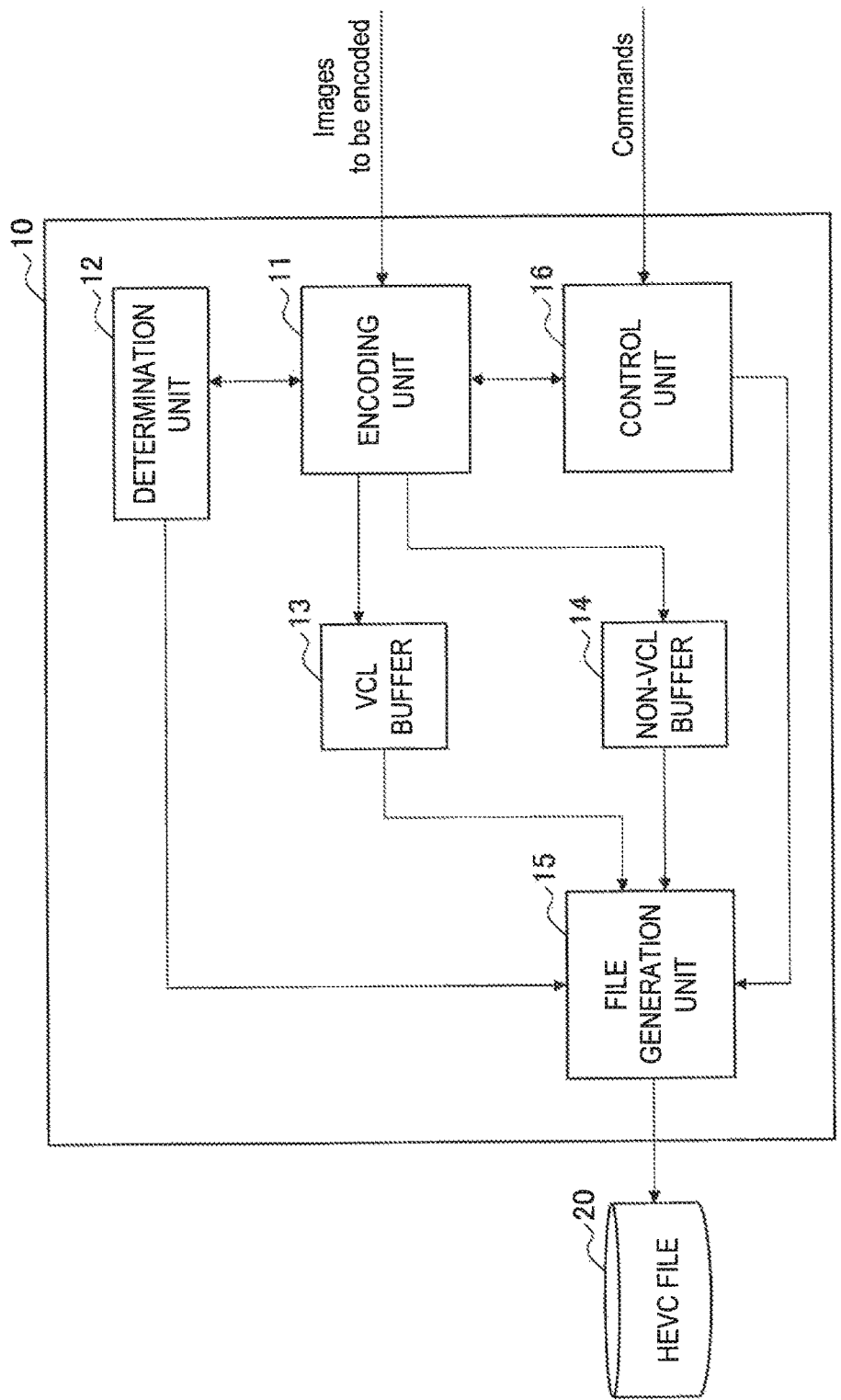
FIG. 1 is a block diagram illustrating an example of the configuration of an image encoding device according to an embodiment.

FIG. 1 is a block diagram illustrating an example of the configuration of an image encoding device 10 according to an embodiment. Referring to FIG. 1, the image encoding device 10 includes an encoding unit 11, a determination unit 12, a VCL buffer 13, a non-VCL buffer 14, a file generation unit 15, and a control unit 16.

(1) Encoding Unit

The encoding unit 11 is an encoder that operates in conformity with an HEVC scheme. The encoding unit 11 acquires an image sequence to be encoded from a moving image source such as a camera or a television tuner connected to the image encoding device 10. Then, the encoding unit 11 generates an encoded bit stream by performing various processes such as intra prediction, inter-frame prediction, orthogonal transform, quantization, and lossless encoding on each image in the acquired image sequence. Slice data corresponding to an entity of an image is generated as a VCL (Video Coding Layer) NAL unit. On the other hand, a parameter set such as an SPS (Sequence Parameter Set), a PPS (Picture Parameter Set), or an APS (Adaptation Parameter Set) can be generated as a non-VCL NAL unit. The encoding unit 11 outputs the VCL NAL unit, i.e., a bit stream of the slice data, to the file generation unit 15 via the VCL buffer 13. The encoding unit 11 outputs the parameter set to the file generation unit 15 via the non-VCL buffer 14.

(2) Determination Unit

The determination unit 12 determines the type of each image in the image sequence to be encoded by the encoding unit 11. More specifically, in the embodiment, the determination unit 12 at least determines whether each image is one of an IDR picture, a CRA picture, or another picture. Both of the IDR picture and the CRA picture are pictures including only I slices. As described above, the IDR picture is a beginning picture of a sequence. A picture subsequent to the IDR picture in the same sequence is located only after the IDR picture in the presentation order without reference to a picture previous to the IDR picture in the encoding order (decoding order). The CRA picture is a picture which is located in the middle of a sequence and can be used as a decoding start picture at the time of random access on a decoder side. A picture subsequent to the CRA picture in both of the encoding order (decoding order) and the presentation order does not refer to either of a picture previous to the CRA picture in the encoding order (decoding order) or a picture previous to the CRA picture in the presentation order. The determination unit 12 outputs a determination result to the encoding unit 11 and the file generation unit 15. The encoding unit 11 assigns an NAL unit type representing the type of each image determined by the determination unit 12 to an NAL header of each NAL unit.

Incidentally, at the time of random access to a CRA picture, only a CRA picture of a random access destination and a picture subsequent to the CRA picture in the decoding order are decoding targets. However, a picture subsequent to the CRA picture in the decoding order and previous to the CRA picture in the presentation order can also be present. In this specification, such a picture is referred to as a previous picture. As understood from the definition of the CRA picture, the previous picture is permitted to refer to a picture previous to the CRA picture in the decoding order. At the time of the random access to the CRA picture, the previous picture referring to the picture previous to the CRA picture in the decoding order is not decoded normally. This is because the reference picture of the previous picture is not decoded. That is, at the time of the random access, whether the decoding target previous picture can be decoded normally depends on a reference relation of the previous picture. Thus, the determination unit 12 may further determine the previous picture which is not decoded normally at the time of the random access to each CRA picture and supply the determination result to the file generation unit 15.

(3) VCL Buffer/Non-VCL Buffer

The VCL buffer 13 buffers a VCL NAL unit. The slice data of the CRA picture is buffered by the VCL buffer 13. The non-VCL buffer 14 buffers a non-VCL NAL unit.

(4) File Generation Unit

The file generation unit 15 generates a moving image file 20 in which a series of encoded image data is stored according to a file format including a header region and a data region. In this specification, an example in which an MP4 format is used as the file format will be mainly described. However, the technology in the present disclosure is not limited to this example and is applicable to other kinds of moving image file formats including a header region and a data region.

In the MP4 format, data is stored in an object called a box and is recorded in units of objects. In one file, a box forms a tree structure and a master box includes a slave box. A kind of each box is identified by an identifier with four letters.

More specifically, the file generation unit 15 inserts a bit stream of the slice data corresponding to the VCL NAL unit into the data region (for example, an mdat box) of the moving image file 20 in the decoding order. The file generation unit 15 inserts one or more parameter sets corresponding to the non-VCL NAL unit into the header region (for example, a moov box) of the moving image file 20. In the embodiment, the file generation unit 15 inserts CRA information used to identify one or more CRA picture determined by the determination unit 12 into the header region of the moving image file 20. The file generation unit 15 may include previous picture information in the CRA information to identify the previous picture which is not decoded normally at the time of the random access to each CRA picture.

(5) Control Unit

The control unit 16 controls an encoding process performed in the image encoding device 10. For example, the control unit 16 causes the encoding unit 11 to encode a designated image sequence when an instruction to start encoding is detected. The control unit 16 causes the file generation unit 15 to generate the moving image file 20 in which the image data encoded by the encoding unit 11 is stored. The control unit 16 may control generation of an encoded stream without a failure of a buffer of a decoder using a virtual decoder model called an HRD (Hypothetical Reference Decoder).

2. EXAMPLE OF CRA INFORMATION

Figure 2:
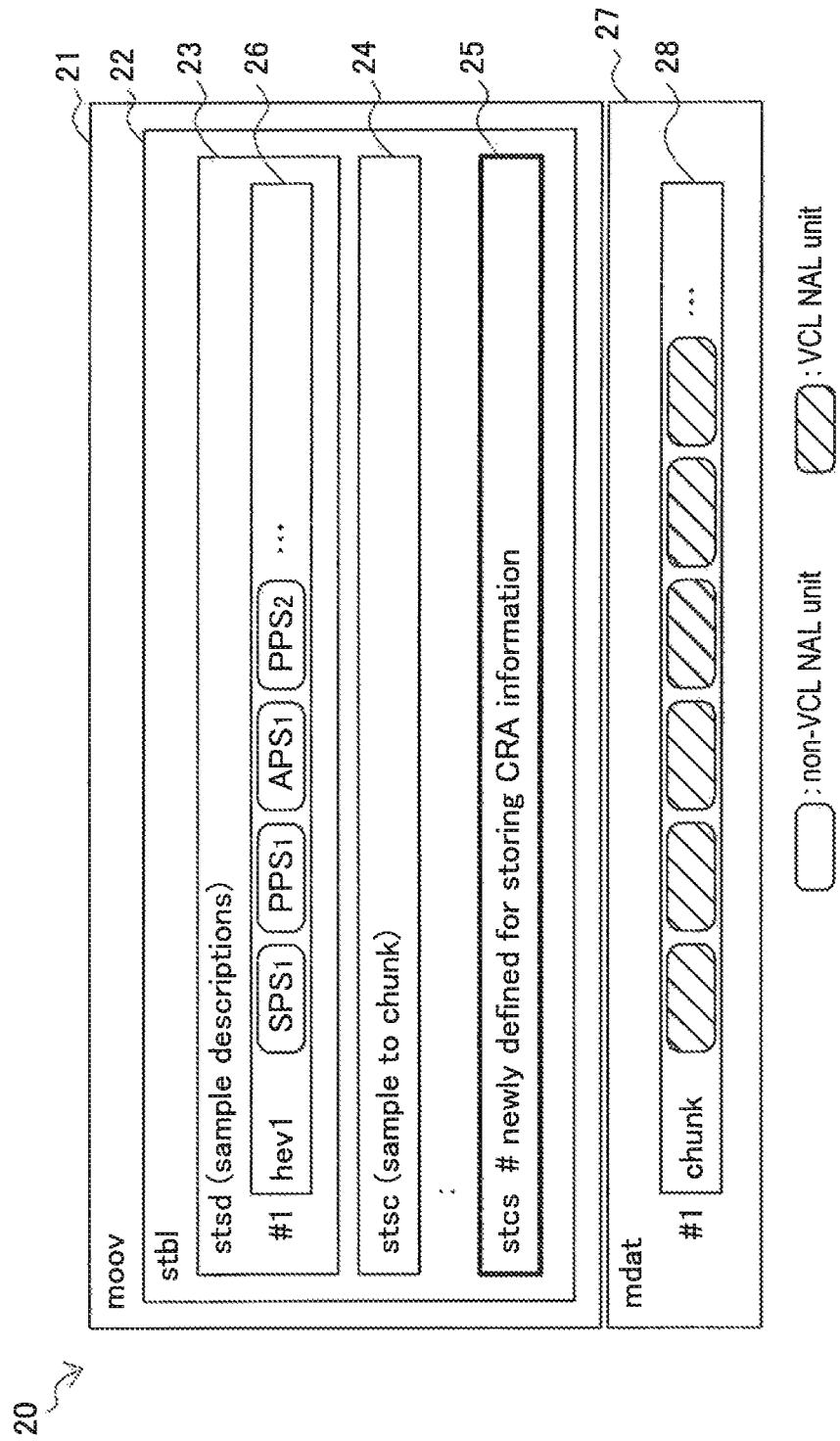
FIG. 2 is an explanatory diagram illustrating an example of a file format which can be adopted in the embodiment.

FIG. 2 is an explanatory diagram illustrating an example of a file format which can be adopted in the embodiment. Referring to FIG. 2, the moving image file 20 includes a moov box 21 and an mdat box 27. A box not directly related in the technology in the present disclosure is not illustrated for the sake of brevity of description.

The moov box 21 is a box that corresponds to the header region of the moving image file 20. The moov box 21 includes an stbl box 22. The stbl box (Sample Table Box) 22 is a container box that includes a box for header information. The stbl box 22 includes an stcs box 25 newly introduced in the embodiment in addition to an stsd box 23 and an stsc box 24. The stsd box (Sample Description Box) 23 is a box that retains parameters associated with actual data stored in the mdat box 27. The stsd box 23 includes an hev1 box 26. The hev1 box 26 is a box that retains a parameter set to be used when the image data encoded in conformity with the HEVC scheme is decoded. The stsc box (Sample To Chunk Box) 24 is a box that retains mapping between actual data called a chunk in the mdat box 27 and the parameters in the stsd box 23. The stcs box 25 is a box that is newly defined to retain the CRA information used to identify one or more CRA pictures.

The mdat box 27 is a box that corresponds to the data region of the moving image file 20. The mdat box 27 includes one or more chunks 28. The chunk refers to actual data that corresponds to an individual moving image track, an individual audio track, or other kinds of tracks. A plurality of pieces of slice data corresponding to each VCL NAL unit are typically stored in the decoding order in the chunk of the image data encoded in conformity with the HEVC scheme.

Figure 3:
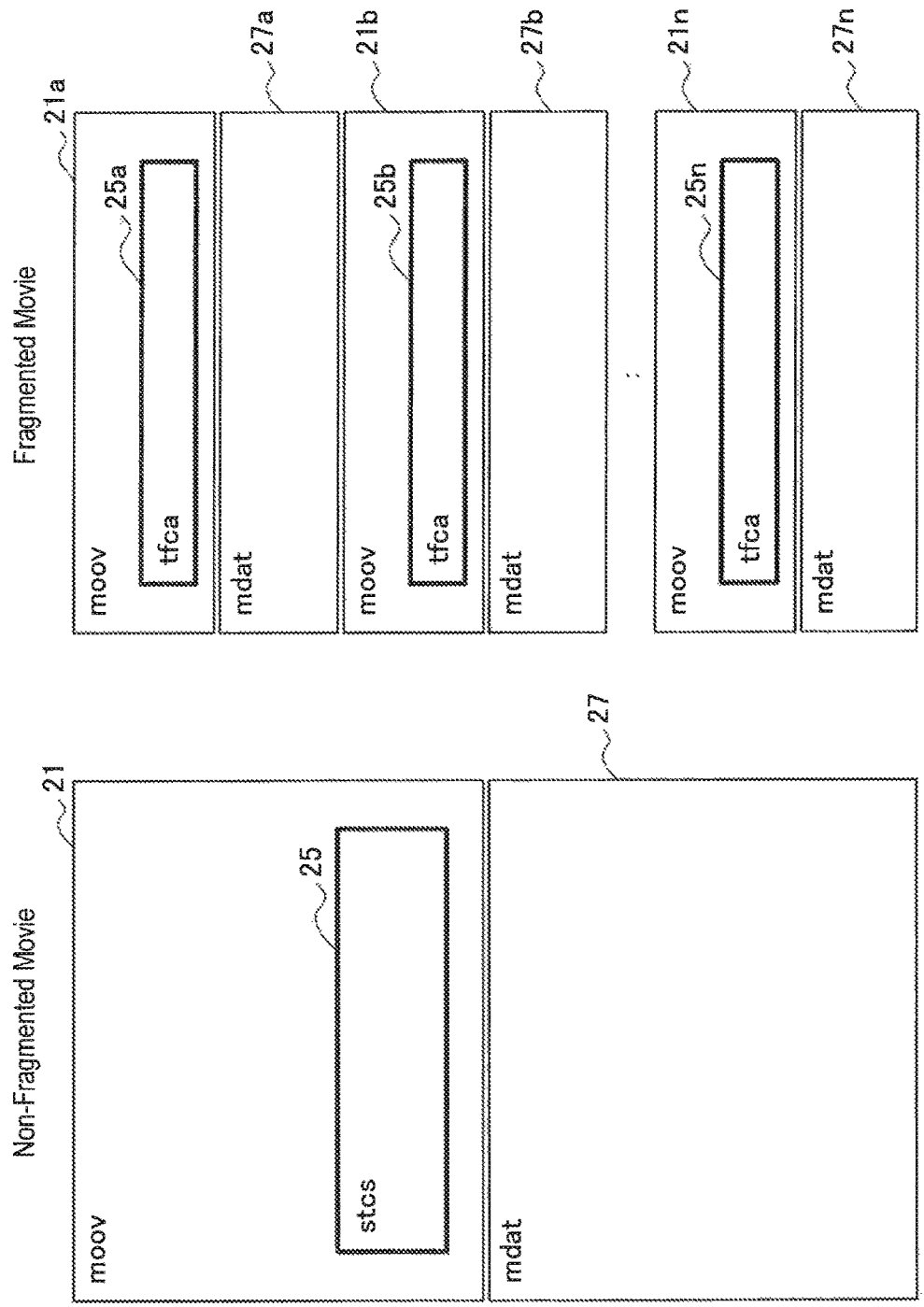
FIG. 3 is an explanatory diagram illustrating another example of the file format which can be adopted in the embodiment.

The moving image file 20 exemplified in FIG. 2 has a so-called Non-Fragmented Movie structure. That is, only one pair of the moov box and the mdat box is present in the moving image file 20. On the other hand, a structure in which one moving image is fragmented into a plurality of pieces and a pair of an moov box and an mdat box is generated for each of the fragmented pieces is referred to as a Fragmented Movie structure. Referring to FIG. 3, comparison between the Non-Fragmented Movie structure and the Fragmented Movie structure is illustrated. In the Non-Fragmented Movie structure, the stcs box 25 for the CRA information is inserted into the moov box 21. On the other hand, in the Fragmented Movie structure, tfca boxes 25a to 25n for the CRA information can be inserted into a plurality of moov boxes 21a to 21n, respectively. Various examples of syntaxes of the newly defined boxes will be described in detail in this section. Identifiers ("stcs" and "tfca") of the boxes illustrated in FIGS. 2 and 3 are merely examples. That is, other four-letter sequences may be used as identifiers of the boxes remaining in the CRA information. Irrespective of the example of FIG. 3, the box retaining the CRA information may be, in practice, inserted as a slave box of the container box such as the stbl box or an mfra box (Movie Fragment Random Access Box) rather than a direct slave box of the moov box.

[2-1. Dedicated Box for CRA Information (Non-Fragmented Movie)]

A box for the CRA information introduced for a Non-Fragmented Movie may be, for example, a dedicated box for the CRA information. FIGS. 4 to 6 illustrate examples of the stcs box as the dedicated box. The stcs box is defined as CRASampleBox class that extends FullBox class.

(1) First Example

In a first example illustrated in FIG. 4, CRASampleBox class includes a sample number (sample_number) of a number indicated by the number of entries (entry_count). The sample numbers indicate each of the sample numbers corresponding to the CRA pictures in a series of samples included in the chunk in the mdat box 27. The number of entries is the same as the number of samples corresponding to the CRA pictures. Referring to the stcs box, a decoder can easily see a chronological order of a sample which is the sample of the CRA picture.

(2) Second Example

In a second example illustrated in FIG. 5, CRASampleBox class includes a set of a sample number (sample_number) and the number of broken samples (broken_samples) of a number indicated by the number of entries (entry_count). The sample numbers indicate each of the sample numbers corresponding to the CRA pictures in a series of samples included in the chunk in the mdat box 27. Each number of broken samples indicates the number of samples (for example, a number from the beginning in the presentation order) of the previous pictures which are not decoded normally at the time of random access to the CRA pictures indicated by the corresponding sample numbers. The fact that the number of samples of the previous pictures which are not decoded normally is unknown may be indicated by a negative value of the number of broken samples. The number of entries is the same as the number of samples corresponding to the CRA pictures. Referring the stcs box, the decoder can easily see a chronological order of a sample which is the sample of the CRA picture and a previous picture which may not be decoded normally at the time of the random access to each CRA picture.

(3) Third Example

In a third example illustrated in FIG. 6, CRASampleBox class includes a set of a sample number (sample_number) and a broken time duration (broken_duration) of a number indicated by the number of entries (entry_count). The sample numbers indicate each of the sample numbers corresponding to the CRA pictures in a series of samples included in the chunk in the mdat box 27. Each broken time duration indicates a sum time duration (for example, a value in units of times defined in an mdhd block) of the previous pictures which are not decoded normally at the time of random access to the CRA pictures indicated by the corresponding sample numbers. The fact that the time duration of the previous pictures which are not decoded normally is unknown may be indicated by a negative value of the broken time duration. The number of entries is the same as the number of samples corresponding to the CRA pictures. Referring the stcs box, the decoder can easily see a chronological order of a sample which is the sample of the CRA picture and a previous picture which may not be decoded normally at the time of the random access to each CRA picture.

[2-2. Shared Box for Random Access Information (Non-Fragmented Movie)]

In the three examples of the preceding section, the CRA information is stored in the stcs box different from a box (for example, an stss box (Sync Sample Box)) in which IDR information used to identify an IDR picture is stored. On the other hand, the CRA information may be stored in a shared box with the IDR information. FIGS. 7 to 9 illustrate examples of an stra box as the shared box. The stra box is defined as RandomAccessSampleBox class that extends the FullBox class.

(1) First Example

In a first example illustrated in FIG. 7, RandomAccessSampleBox class includes a set of a sample type (sample_type) and a sample number (sample_number) of a number indicated by the number of entries (entry_count). The sample numbers indicate each of the sample numbers corresponding to the IDR pictures or the CRA pictures in a series of samples included in the chunk in the mdat box 27. Each sample type indicates that a picture indicated by a corresponding sample number is one of the IDR picture and the CRA picture. A value of the sample type may be, for example, the same value as that of the NAL unit typo. The number of entries is the same as the number of samples corresponding to the IDR pictures or the CRA pictures. Referring to the stra box, the decoder can easily see a chronological order of a sample which is the sample of the IDR picture and a chronological order of the sample which is the sample of the CRA picture.

(2) Second Example

In a second example illustrated in FIG. 8, RandomAccessSampleBox class includes a set of a sample type (sample_type), a sample number (sample_number), and the number of broken samples (broken_samples) of a number indicated by the number of entries (entry_count). The sample numbers indicate each of the sample numbers corresponding to the IDR pictures or the CRA pictures in a series of samples included in the chunk in the mdat box 27. Each sample type indicates that a picture indicated by a corresponding sample number is one of the IDR picture and the CRA picture. Each number of broken samples indicates the number of samples of the previous pictures which are not decoded normally at the time of random access to the pictures indicated by the corresponding sample numbers. The number of broken samples for the IDR pictures may be omitted or indicate zero. The number of entries is the same as the number of samples corresponding to the IDR pictures or the CRA pictures. Referring the stra box, the decoder can easily see a chronological order of a sample which is the sample of the IDR picture, a chronological order of the sample which is the sample of the CRA picture, and a previous picture which may not be decoded normally at the time of the random access to each CRA picture.

(3) Third Example

In a third example illustrated in FIG. 9, RandomAccessSampleBox class includes a set of a sample type (sample_type), a sample number (sample_number), and a broken time duration (broken_duration) of a number indicated by the number of entries (entry_count). The sample numbers indicate each of the sample numbers corresponding to the IDR pictures or the CRA pictures in a series of samples included in the chunk in the mdat box 27. Each sample type indicates that a picture indicated by a corresponding sample number is one of the IDR picture and the CRA picture. Each broken time duration indicates a sum time duration of the previous pictures which are not decoded normally at the time of random access to the pictures indicated by the corresponding sample numbers. The broken time duration for the IDR pictures may be omitted or indicate zero. The number of entries is the same as the number of samples corresponding to the IDR pictures or the CRA pictures. Referring the stra box, the decoder can easily see a chronological order of a sample which is the sample of the IDR picture, a chronological order of the sample which is the sample of the CRA picture, and a previous picture which may not be decoded normally at the time of the random access to each CRA picture.

[2-3. Dedicated Box for CRA Information (Fragmented Movie)]

A box for the CRA information introduced for a Fragmented Movie may be, for example, a dedicated box for the CRA information. FIGS. 10 to 12 illustrate examples of the tfca box as the dedicated box. The tfca box is defined as TrackFragmentCRAAccessBox class that extends FullBox class.

(1) First Example

In a first example illustrated in FIG. 10, TrackFragmentCRAAccessBox class includes a sample number (sample_number) of a number indicated by the number of entries (number_of_entry). The sample numbers indicate each of the sample numbers corresponding to the CRA pictures in a series of samples included in the chunk in the mdat box of the corresponding fragment. The number of entries is the same as the number of samples corresponding to the CRA pictures. Referring to the tfca box, the decoder can easily see a chronological order of a sample of each fragment which is the sample of the CRA picture.

(2) Second Example

In a second example illustrated in FIG. 11, TrackFragmentCRAAccessBox class includes a set of a sample number (sample_number) and the number of broken samples (preceding_samples) of a number indicated by the number of entries (number_of_entry). The sample numbers indicate each of the sample numbers corresponding to the CRA pictures in a series of samples included in the chunk in the mdat box of the corresponding fragment. Each number of broken samples indicates the number of samples (for example, a number from the beginning in the presentation order) of the previous pictures which are not decoded normally at the time of random access to the CRA pictures indicated by the corresponding sample numbers. The fact that the number of samples of the previous pictures which are not decoded normally is unknown may be indicated by a negative value of the number of broken samples. The number of entries is the same as the number of samples corresponding to the CRA pictures. Referring the tfca box, the decoder can easily see a chronological order of a sample of each fragment which is the sample of the CRA picture and a previous picture which may not be decoded normally at the time of the random access to each CRA picture.

(3) Third Example

In a third example illustrated in FIG. 12, TrackFragmentCRAAccessBox class includes a set of a sample number (sample_number) and a broken time duration (preceding_duration) of a number indicated by the number of entries (number_of_entry). The sample numbers indicate each of the sample numbers corresponding to the CRA pictures in a series of samples included in the chunk in the mdat box of the corresponding fragment. Each broken time duration indicates a sum time duration (for example, a value in units of times defined in an mdhd block) of the previous pictures which are not decoded normally at the time of random access to the CRA pictures indicated by the corresponding sample numbers. The fact that the time duration of the previous pictures which are not decoded normally is unknown may be indicated by a negative value of the broken time duration. The number of entries is the same as the number of samples corresponding to the CRA pictures. Referring the tfca box, the decoder can easily see a chronological order of a sample of each fragment which is the sample of the CRA picture and a previous picture which may not be decoded normally at the time of the random access to each CRA picture.

[2-4. Shared Box for Random Access Information (Fragmented Movie)]

In the three examples of the preceding section, the CRA information is stored in the tfca box different from the box in which IDR information used to identify an IDR picture is stored. On the other hand, the CRA information may be stored in a shared box with the IDR information. FIGS. 13 to 15 illustrate examples of a tfr2 box as the shared box. The tfr2 box is defined as ExtTrackFragmentRandomAccessBox class that extends the FullBox class.

(1) First Example

In a first example illustrated in FIG. 13, ExtTrackFragmentRandomAccessBox class includes a set of a sample type (sample_type) and a sample number (sample_number) of a number indicated by the number of entries (number_of_entry). The sample numbers indicate each of the sample numbers corresponding to the IDR pictures or the CRA pictures in a series of samples included in the chunk in the mdat box of the corresponding fragment. Each sample type indicates that a picture indicated by a corresponding sample number is one of the IDR picture and the CRA picture. A value of the sample type may be, for example, the same value as that NAL unit type. The number of entries is the same as the number of samples corresponding to the IDR pictures or the CRA pictures. Referring to the tfr2 box, the decoder can easily see a chronological order of a sample of each fragment which is the sample of the IDR picture and a chronological order of the sample which is the sample of the CRA picture.

(2) Second Example

In a second example illustrated in FIG. 14, ExtTrackFragmentRandomAccessBox class includes a set of a sample type (sample_type), a sample number (sample_number), and the number of broken samples (preceding_samples) of a number indicated by the number of entries (number_of_entry). The sample numbers indicate each of the sample numbers corresponding to the IDR pictures or the CRA pictures in a series of samples included in the chunk in the mdat box of a corresponding fragment. Each sample type indicates that a picture indicated by a corresponding sample number is one of the IDR picture and the CRA picture. Each number of broken samples indicates the number of samples of the previous pictures which are not decoded normally at the time of random access to the pictures indicated by the corresponding sample numbers. The number of broken samples for the IDR pictures may be omitted or indicate zero. The number of entries is the same as the number of samples corresponding to the IDR pictures or the CPA pictures. Referring the tfr2 box, the decoder can easily see a chronological order of a sample of each fragment which is the sample of the IDR picture, a chronological order of the sample which is the sample of the CRA picture, and a previous picture which may not be decoded normally at the time of the random access to each CRA picture.

(3) Third Example

In a third example illustrated in FIG. 15, ExtTrackFragmentRandomAccessBox class includes a set of a sample type (sample_type), a sample number (sample_number), and a broken time duration (preceding_duration) of a number indicated by the number of entries (number_of_entry). The sample numbers indicate each of the sample numbers corresponding to the IDR pictures or the CRA pictures in a series of samples included in the chunk in the mdat box of a corresponding fragment. Each sample type indicates that a picture indicated by a corresponding sample number is one of the IDR picture and the CRA picture. Each broken time duration indicates a sum time duration of the previous pictures which are not decoded normally at the time of random access to the pictures indicated by the corresponding sample numbers. The broken time duration for the IDR pictures may be omitted or indicate zero. The number of entries is the same as the number of samples corresponding to the IDR pictures or the CRA pictures. Referring the tfr2 box, the decoder can easily see a chronological order of a sample of each fragment which is the sample of the IDR picture, a chronological order of the sample which is the sample of the CRA picture, and a previous picture which may not be decoded normally at the time of the random access to each CRA picture.

[2-5. Utilization of Sample Group]

The CRA information may be defined by utilizing the structure of known sample group information for grouping one or more samples instead of storing the CRA information in the expanded sample box newly defined as in the examples of FIGS. 4 to 15.

(1) Box for Sample Group Information.

FIGS. 16 and 17 are explanatory diagrams illustrating a box for basic sample group information.

Referring to FIG. 16, a syntax of SampleToGroupBox class that defines an sbgp box (Sample To Group Box) is illustrated. SampleToGroupBox class includes a set of a sample counter (sample_count) and a group description index (group_description_index) of a number indicated by the number of entries (entry_count). Each set associates each sample with a sample group to which the sample belongs.

Referring to FIG. 17, a syntax of SampleGroupDescriptionBox class that defines an sgpd box (Sample Group Description Box) is illustrated. An instance of SampleGroupDescriptionBox class is associated with an instance of SampleToGroupBox class having a common grouping type (grouping_type). When a handler type (handler_type) indicates "vide (moving image track)," SampleGroupDescriptionBox class includes entries of sample group information defined by VisualSampleGroupEntry class. The number of entries (entry_count) indicates the number of entries of the sample group information.

Six examples of the sample group information for the CRA information used to define the CRA information utilizing the structure of such known sample group information are illustrated in FIGS. 18 to 23. The first to third examples are examples of dedicated sample group information for the CRA information. The fourth to sixth examples are examples of shared sample group information for the IDR information and the CRA information.

(2) First Example

Referring to FIG. 18, a syntax of CRAEntry class that extends VisualSampteGroupEntry class is illustrated. The group type is "crap." CRAEntry class includes only a reserved field. A sample associated with the sample group of CRAEntry class in the sbgp box described with reference to FIG. 16 is a sample of the CRA picture.

(3) Second Example

Referring to FIG. 19, a syntax of CRAPointEntry class that extends VisualSampleGroupEntry class is illustrated. The group type is "crap." CRAPointEntry class includes the number of broken samples (broken_samples) as a group attribute. A sample associated with the sample group of CRAPointEntry class in the sbgp box described with reference to FIG. 16 is a sample of the CRA picture. The number of broken samples indicates the number of samples (for example, a number from the beginning in the presentation order) of the previous pictures which are not decoded normally at the time of random access to each CRA picture.

(4) Third Example

Referring to FIG. 20, another syntax of CRAPointEntry class that extends VisualSampleGroupEntry class is illustrated. The group type is "crap," CRAPointEntry class includes a broken time duration (broken_duration) as a group attribute. The broken time duration indicates a sum time duration of the previous pictures which are not decoded normally at the time of random access to each CRA picture.

(5) Fourth Example

Referring to FIG. 21, a syntax of ExtRAPEntry class that extends VisualSampleGroupEntry class is illustrated. The group type is "rap2." ExtRAPEntry class includes a sample type (sample_type) as a group attribute. A sample associated with the sample group of ExtRAPEntry class in the sbgp box described with reference to FIG. 16 is a sample of the IDR picture or the CRA picture. The sample type indicates that each picture is one of the IDR picture and the CRA picture. A value of the sample type may be, for example, the same value as the NAL unit type.

(6) Fifth Example

Referring to FIG. 22, another syntax of ExtRAPEntry class that extends VisualSampleGroupEntry class is illustrated. The group type is "rap2." ExtRAPEntry class includes a sample type (sample_type) and the number of broken samples (broken_samples) as group attributes. The number of broken samples indicates the number of samples of the previous pictures which are not decoded normally at the time of random access to each picture. The number of broken samples for the IDR picture may be omitted or indicate zero.

(7) Sixth Example

Referring to FIG. 23, still another syntax of ExtRAPEntry class that extends VisualSampleGroupEntry class is illustrated. The group type is "rap2." ExtRAPEntry class includes a sample type (sample_type) and a broken time duration (broken_duration) as group attributes. The broken time duration indicates a sum time duration of the previous pictures which are not decoded normally at the time of random access to each picture. The broken time duration for the IDR picture may be omitted or indicate zero.

In this way, by utilizing the structure of the known sample group information, the CRA information can be defined without introducing a new sample box. In this case, since the decoder may not handle a new sample box, it is possible to extend the known decoder at a lower cost and provide efficient support of the random access to the CRA pictures.

3. EXAMPLE OF CONFIGURATION OF IMAGE DECODING DEVICE ACCORDING TO EMBODIMENT

In this section, an image decoding device decoding the encoded image data in conformity with the HEW scheme from the moving image file with the new file format described in the previous section will be described. FIG. 24 is a block diagram illustrating an example of the configuration of an image decoding device 30 according to the embodiment. Referring to FIG. 24, the image decoding device 30 includes a VCL buffer 31, a non-VCL buffer 32, a parameter memory 33, a decoding unit 34, an output buffer 35, a CRA information acquisition unit 36, and a control unit 37.

(1) VCL Buffer/Non-VCL Buffer

The VCL buffer 31 buffers the bit stream of the image data (typically, slice data) read from the data region (for example, the mdat box) of the moving image file 20. The non-VCL buffer 32 buffers the parameter set such as the SPS, the PPS, and the APS read from the header region (for example, the moov box) of the moving image file 20 and header information such as the CRA information.

(2) Parameter Memory

The parameter memory 33 collectively stores information in the header region of a file acquired via the non-VCL buffer 32. The CRA information which can be recorded in the header region of the moving image file 20 in the above-described various formats is retained by the parameter memory 33 while the moving image file 20 is opened.

(3) Decoding Unit

The decoding unit 34 is a decoder that operates in conformity with the HEVC scheme. The decoding unit 34 decodes an image sequence from the bit stream acquired from the data region of the moving image file 20 via the VCL buffer 31. The decoding unit 34 uses parameters in a parameter set stored by the parameter memory 33 when the decoding unit 34 decodes an image. The decoding unit 34 sorts images in a decoded image sequence in a presentation order and outputs the sorted images to the output buffer 35.

The decoding unit 34 normally accesses the slice data stored in a decoding order in the moving image track in the moving image file 20 in order from the beginning. However, when an instruction of random access is detected by the control unit 37, the decoding unit 34 makes random access to a decoding start picture specified by the control unit 37 (in the middle of the moving image track) and decodes the image sequence from the decoding start picture. The decoding start picture is one of the IDR picture and the CRA picture in the moving image track.

(4) Output Buffer

The output buffer 35 is a decoded picture buffer (DPB) that buffers images decoded by the decoding unit 34. The images buffered by the output buffer 35 are output to a display or a processor (not illustrated) at output timings of the images.

(5) CRA Information Acquisition Unit

The CRA information acquisition unit 36 acquires the CRA information read from the header region of the moving image file 20 to the parameter memory 33 via the non-VCL buffer 32. The CRA information is information used to identify at least one or more CRA pictures in the decoded image sequence. The CRA information may be information that is stored in the dedicated sample box or the shared sample box of the CRA information. Instead, the CRA information may be sample group information grouping one or more CRA pictures. The CRA information may include previous picture information used to identify the previous picture which is not decoded normally at the time of random access to each CRA picture. The CRA information acquisition unit 36 outputs the acquired CRA information to the control unit 37.

(6) Control Unit

The control unit 37 controls the decoding process performed in the image decoding device 30. For example, the control unit 37 opens the moving image file 20 in response to an instruction from a user and causes the decoding unit 34 to start decoding the image sequence. When an instruction of random access is detected, the control unit 37 specifies one of the CRA pictures in the image sequence as the decoding start picture based on the CRA information acquired by the CRA information acquisition unit 36. Then, the control unit 37 causes the decoding unit 34 to decode the image sequence from the specified decoding start picture (that is, from the middle of the moving image track).

The control unit 37 typically specifies the CRA picture located closest to a timing designated in the instruction of the random access (for example, a timing instructed by an operated pointer of a seek bar of a moving image reproduction window) as the decoding start picture. Several examples of the flow of a process of specifying the decoding start picture will be described in detail below.

When the CRA information includes the above-described previous picture information, the control unit 37 may skip the output of the previous pictures from the output buffer 35 which are identified based on the previous picture information and are not decoded normally (and the decoding by the decoding unit 34). By using the previous picture information, it is possible to prevent a broken image from being displayed on a display or output to an external processor. At this time, the control unit 37 may not determine later whether each image is decoded normally.

4. FLOW OF DECODING PROCESS

[4-1. Decoding Process for Non-Fragmented Movie]

(1) Overall Flow

Figure 25:
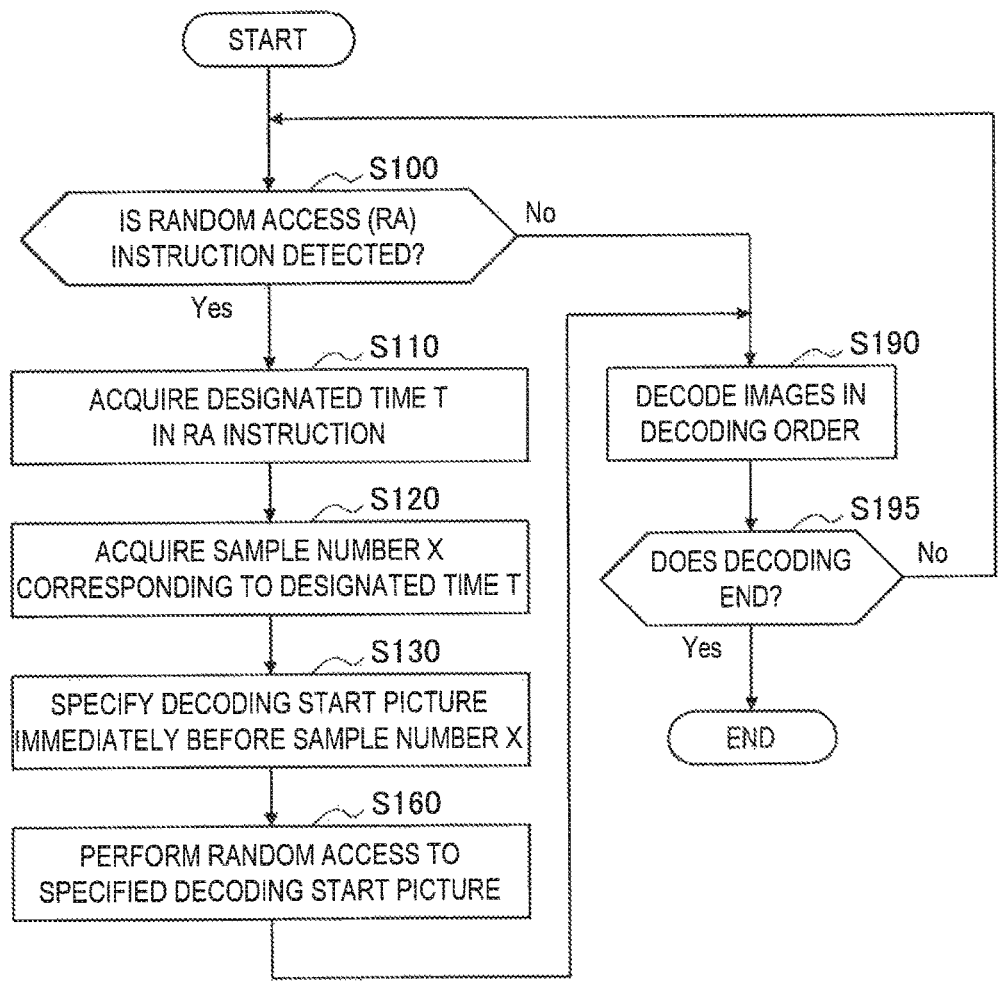
FIG. 25 is a flowchart illustrating a first example of the flow of a decoding process performed by the device exemplified in FIG. 24.

FIG. 25 is a flowchart illustrating a first example of the flow of a decoding process performed by the image decoding device 30 exemplified in FIG. 24. The first example is associated with decoding of an image sequence that has the Non-Fragmented Movie structure.

In the decoding process exemplified in FIG. 25, the control unit 37 continuously monitors a random access (RA) instruction (step S100). When the RA instruction is detected, processes of steps S110 to S160 are performed. When no RA instruction is detected, the decoding unit 34 decodes the images in the decoding order (step S190).

When the RA instruction is detected, the control unit 37 acquires a designated time T indicating a designated timing in the RA instruction (step S110). Next, the control unit 37 acquires a sample number X of a sample (a sample to be displayed at the designated time T) corresponding to the designated time T (step S120). Next, the control unit 37 retrieves randomly accessible pictures immediately before the sample number X based on the CRA information and specifies the decoding start picture (step S130). The decoding start picture specified herein is the CRA picture or the IDR picture. Next, the decoding unit 34 performs the random access to the decoding start picture specified by the control unit 37 (step S160). Then, the decoding unit 34 decodes the images from the decoding start picture in the decoding order (step S190).

The above-described processes are repeated until an instruction to end the decoding or the final image is decoded (step S195).

(2) Acquiring Sample Number Corresponding to Designated Time

Figure 26:
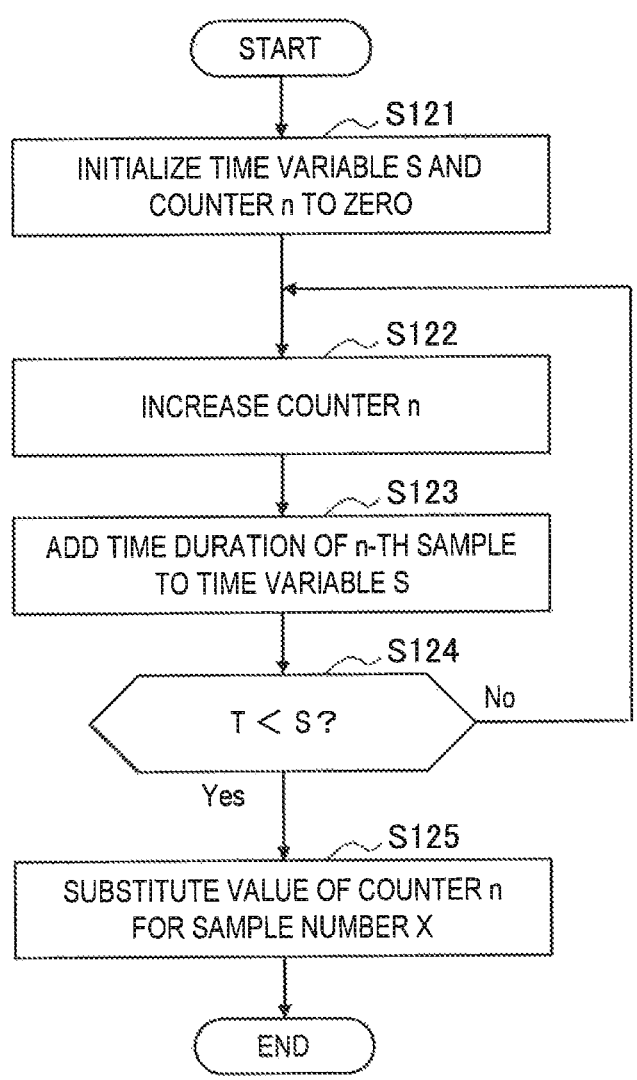
FIG. 26 is a flowchart illustrating an example of the flow of a process of acquiring a sample number corresponding to a designated time.

FIG. 26 is a flowchart illustrating an example of the flow of a process corresponding to step S120 of FIG. 25 and performed to acquire a sample number X corresponding to a designated time T.

Referring to FIG. 26, the control unit 37 first initializes a time variable S and a counter n to zero (step S121). Next, the control unit 37 increases the counter n (that is, adds 1 to the counter n) (step S122). Next, the control unit 37 adds a time duration of an n-th sample of a moving image track to the time variable S (step S123). For example, the time duration of the n-th sample can be indicated by a parameter (sample_delta) in an stts box (Time To Sample Box). Next, the control unit 37 determines whether the time variable S exceeds the designated time T (S>T) (step S124). Here, when the time variable S does not yet exceed the designated time T, the process returns to step S122. Conversely, when the time variable S exceeds the designated time, the control unit 37 substitutes the value of the counter n for the sample number x (step S125).

Through such processes, the sample number X corresponding to the designated time T is acquired.

(3) Specifying Decoding Start Picture

Figure 27:
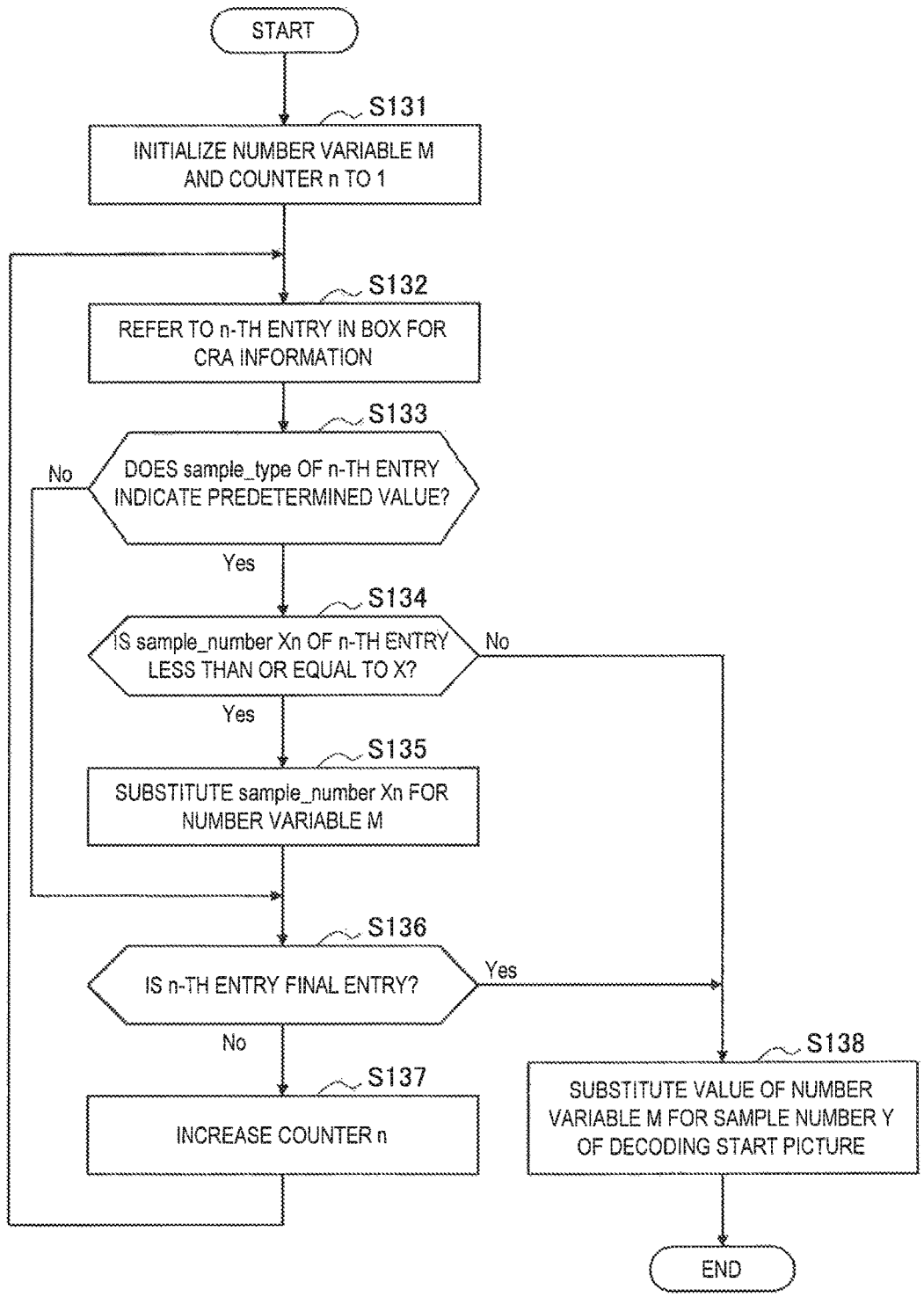
FIG. 27 is a flowchart illustrating a first example of the flow of a process of specifying a decoding start picture.

FIG. 27 is a flowchart illustrating a first example of the flow of the process corresponding to step S130 of FIG. 25 and performed to specify the decoding start picture. In the first example, the CRA information is assumed to be stored in the stcs box exemplified in FIGS. 4 to 6 and the stra box exemplified in FIGS. 7 to 9.

Referring to FIG. 27, the control unit 37 first initializes a number variable M and the counter n to 1 (step S131). Next, the control unit 37 refers to an n-th entry in the sample box for the CRA information (step S132). Next, the control unit 37 determines whether the sample type (sample_type) of the n-th entry indicates a predetermined value (for example, the value of the NAL unit type indicating the CRA picture or the IDR picture (step S133). When the sample box for the CRA information does not include the sample type, the determination is omitted herein. When the sample type of the n-th entry does not indicate the predetermined value, the subsequent process of step S134 is skipped and the process proceeds to step S136. When the sample type of the n-th entry indicates the predetermined value, the control unit 37 determines whether a sample number (sample_number) Xn of the n-th entry is equal to or less than the sample number X corresponding to the designated time T (step S134). Here, when the sample number Xn is not equal to or less than the sample number X, the process proceeds to step S138. Conversely, when the sample number Xn is equal to or less than the sample number X, the control unit 37 substitutes the sample number Xn for the number variable M (step S135). Next, the control unit 37 determines whether the n-th entry is the final entry (step S136). When the n-th entry is not the final entry, the control unit 37 increases the counter n (step S137) and the process returns to step S132. When the n-th entry is the final entry, the process proceeds to step S138. In step S138, the control unit 37 substitutes the value of the number variable M for a sample number Y of the decoding start picture (step S138). When the sample box for the CRA information is defined separately from the sample box for the IDR information, the same process as that of FIG. 27 may be further performed on the sample box for the IDR information. In this case, a value closer to the sample number X can be adopted as the sample number Y of the decoding start picture.

Figure 28:
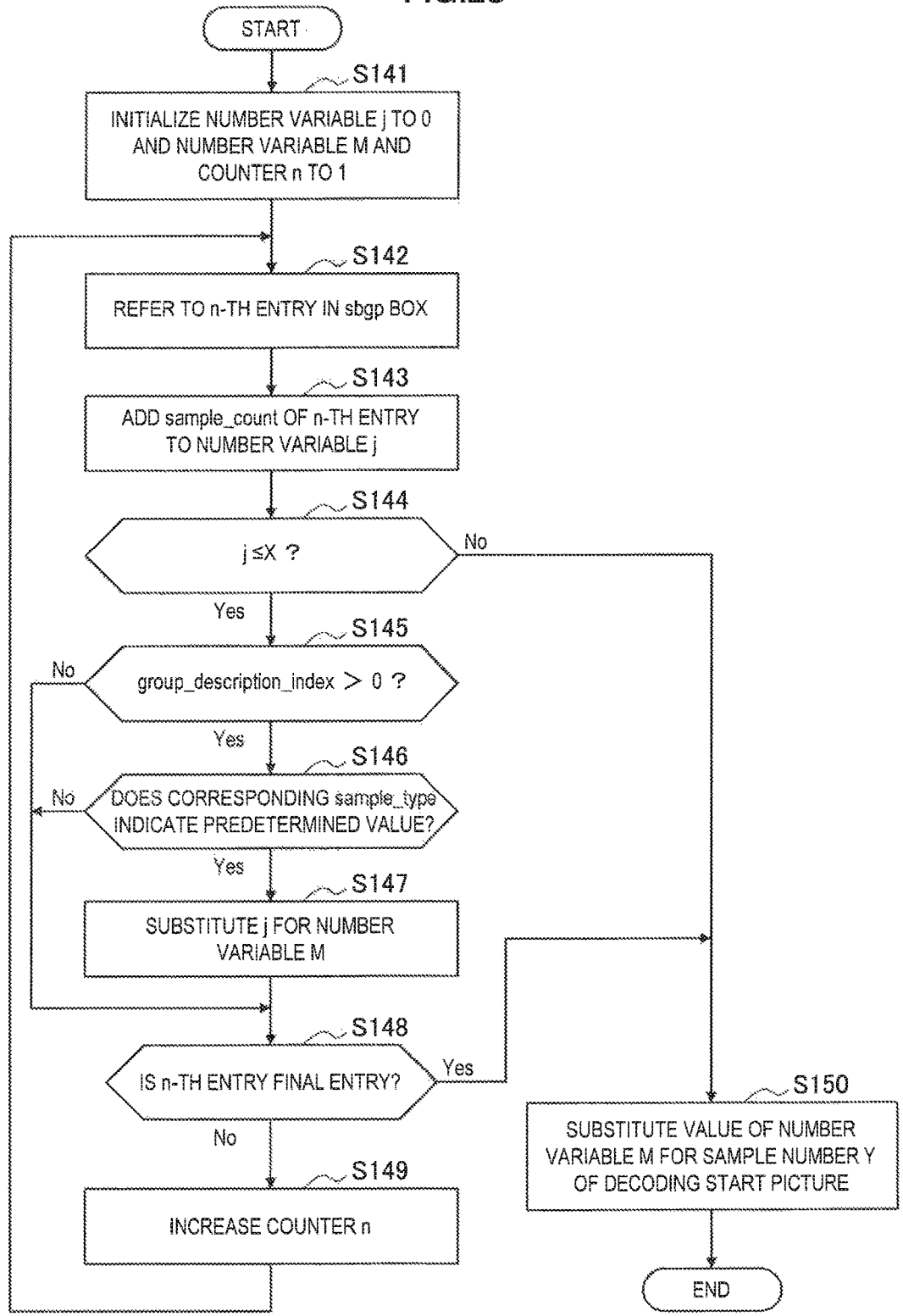
FIG. 28 is a flowchart illustrating a second example of the flow of a process of specifying a decoding start picture.

FIG. 28 is a flowchart illustrating a second example of the flow of the process corresponding to step S130 of FIG. 25 and performed to specify the decoding start picture. In the second example, the CRA information is assumed to be sample group information grouping the CRA picture, as exemplified in FIGS. 18 to 23.

Referring to FIG. 28, the control unit 37 first initializes a number variable j to zero and initializes the number variable M and the counter n to 1 (step S141). Next, the control unit 37 refers to an n-th entry in the sbgp box described with reference to FIG. 16 (step S142). The sbgp box referred to herein is a box that includes the group types "crap" and "rap2."

Next, the control unit 37 adds a sample counter (sample_count) of the n-th entry in the sbgp box to the number variable j. Next, the control unit 37 determines whether the number variable j is equal to or less than the sample number X corresponding to the designated time T (S144). Here, when the number variable j is not equal to or less than the sample number X, the process proceeds to step S150. Conversely, when the number variable j is equal to or less than the sample number X, the process proceeds to step S145. In step S145, the control unit 37 determines whether a group description index (group_description_index) of the n-th entry is greater than zero, i.e., the sample corresponding to the number variable j is grouped to one sample group (step S145). Here, when the group description index is greater than zero, the control unit 37 further determines whether the corresponding sample type (sample_type) indicates a predetermined value (for example, the value of the NAL unit type indicating the CRA picture or the IDR picture) (step S146). Here, when the corresponding sample type indicates the predetermined value, the control unit 37 substitutes the number variable j for the number variable M (step S147). Conversely, when the corresponding sample type does not indicate the predetermined value or when the group description index is not greater than zero, the process of step S147 is skipped and the process proceeds to step S148. When the sample group information does not include the sample type as the group attribute, the determination of step S146 is omitted. Next, the control unit 37 determines whether the n-th entry is the final entry (step S148). When the n-th entry is not the final entry, the control unit 37 increases the counter n (step S149) and the process returns to step S142. When the n-th entry is the final entry, the process proceeds to step S150. In step S150, the control unit 37 substitutes the value of the number variable M for the sample number Y of the decoding start picture (step S148).

Through the process exemplified in FIG. 27 or 28, the sample number Y of the decoding start picture is specified. When the CRA picture is not included in the image sequence, the IDR picture of the beginning of the image sequence can become the decoding start picture. The number of bytes from the beginning of a file to the beginning of each chunk is stored in an stco box (Chunk Offset Box). The number of bytes of each sample is stored in an stsz box (Sample Size Box). Accordingly, when the sample number V of the decoding start picture is specified, the position (the number of bytes from the beginning of the file) of the decoding start picture in the file can be calculated based on information regarding the sample number Y.

(4) Skipping Output of Previous Pictures which are not Decoded Normally

Figure 29:
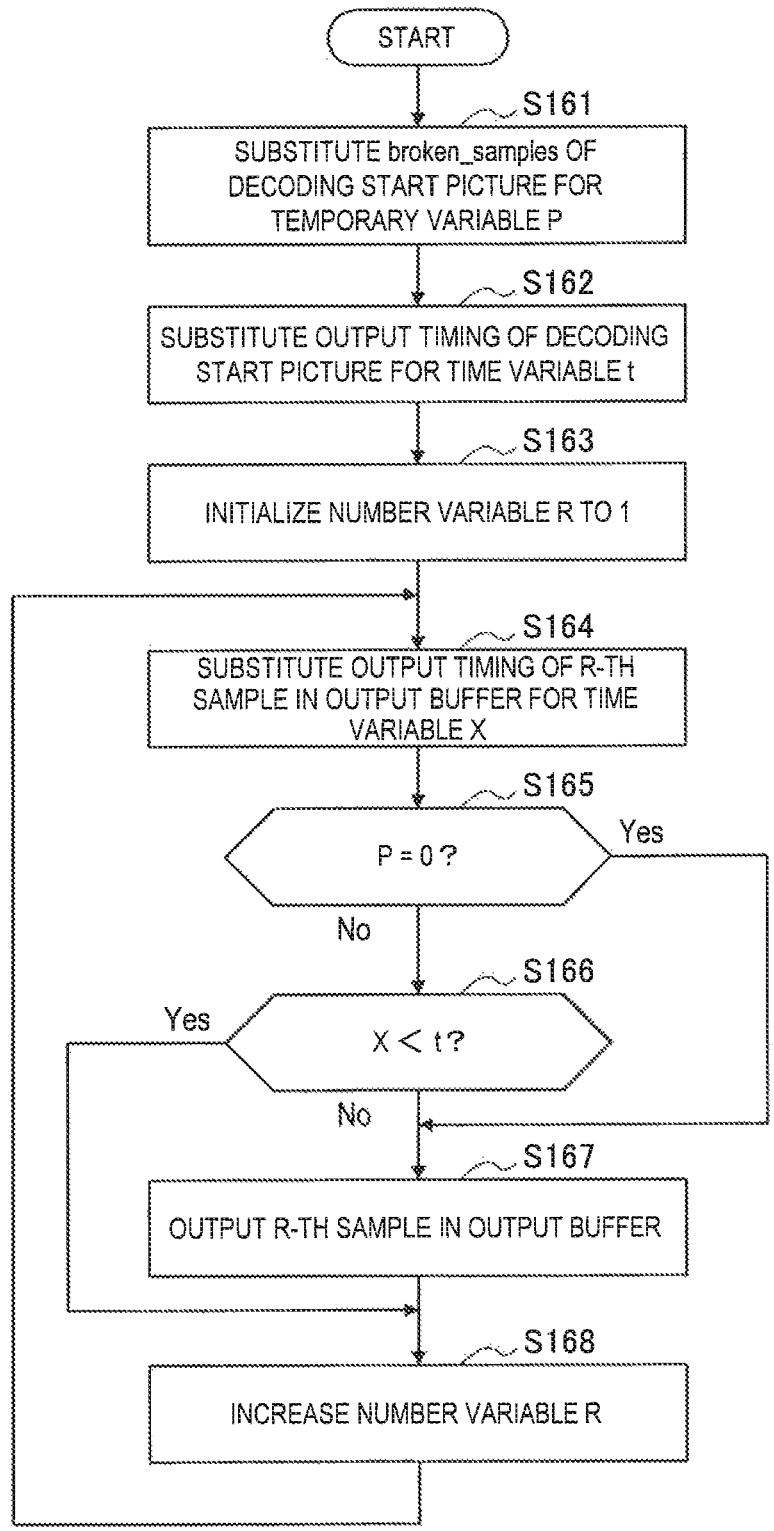
FIG. 29 is a flowchart illustrating a first example of the flow of a process of skipping output of a preceding picture which is not decoded normally.
Figure 30:
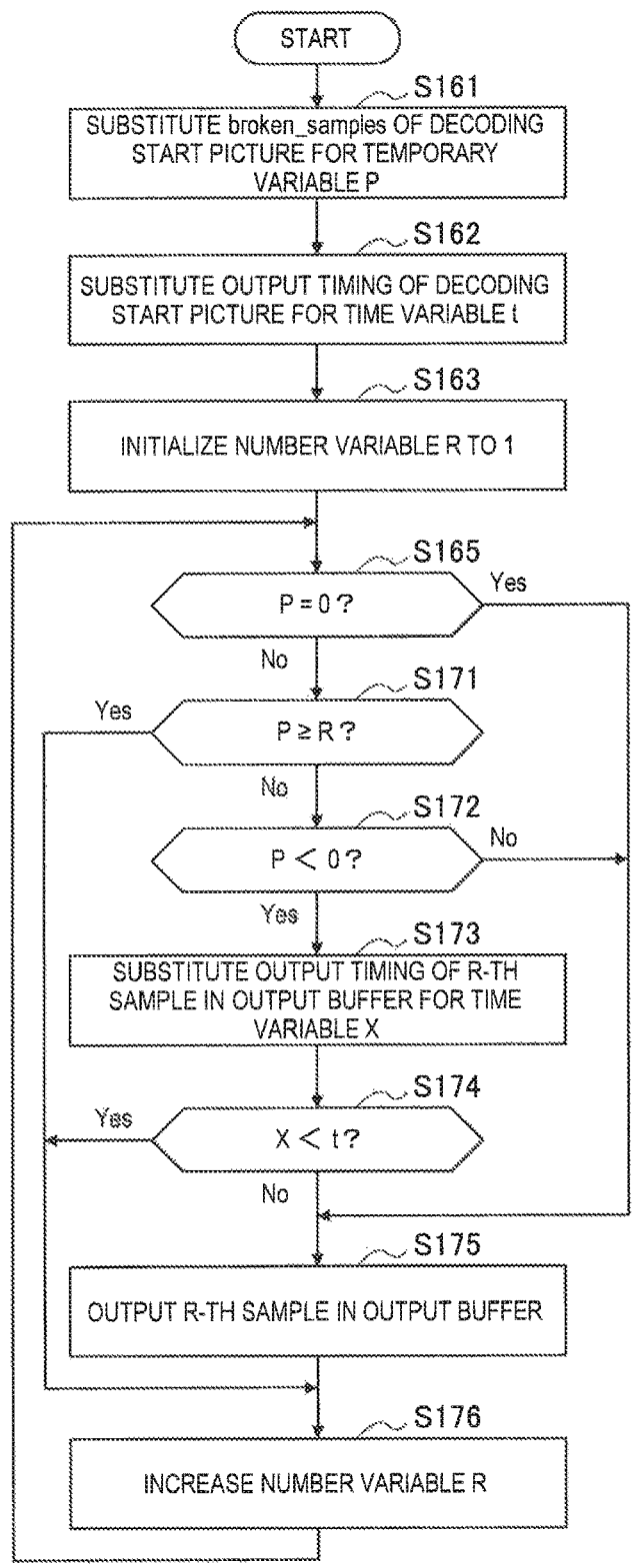
FIG. 30 is a flowchart illustrating a second example of the flow of a process of skipping output of a preceding picture which is not decoded normally.

FIGS. 29 and 30 illustrate three examples of the flow of the process of skipping the output of the previous pictures which are not decoded normally when proceeding from step S160 to step S190 in FIG. 25.

In a first example of FIG. 29, the CRA information is assumed to include the number of broken samples (broken samples) for each CRA picture. First, the control unit 37 substitutes the number of broken samples of the decoding start picture for a temporary variable P (step S161). Next, the control unit 37 substitutes an output timing of the decoding start picture for a time variable t (step S162). Next, the control unit 37 initializes the number variable R to 1 (step S163).

Next, the control unit 37 substitutes an output timing of an R-th sample in the output buffer 35 for a time variable X (step S164). Next, the control unit 37 determines whether the temporary variable P is zero, i.e., the number of broken samples is zero (step S165). When the number of broken samples is not zero, the process proceeds to step S166. Conversely, when the number of broken samples is zero, the process proceeds to step S167. In step S166, the control unit 37 determines whether the time variable X is less than t, i.e., the R-th sample is the previous sample of the decoding start picture (step S166). When the R-th sample is not the previous sample of the decoding start picture or the number of broken samples is zero, the R-th sample decoded by the decoding unit 34 is output from the output buffer 35 (step S167). Conversely, when the R-th sample is the previous sample of the decoding start picture, the output of the R-th sample is skipped and the process proceeds to step S168. Thereafter, the number variable R increases (step S168) and the process returns to step S164.

In the first example, the output of the previous sample of the decoding start picture is skipped uniformly.

In a second example of FIG. 30, the CRA information is also assumed to include the number of broken samples (broken_samples) for each CRA picture. First, the processes of steps S161 to S163 are the same as those of the first example illustrated in FIG. 29.

In the second example, after the number variable R is initialized to 1, the control unit 37 determines whether the temporary variable P is zero, i.e., the number of broken samples is zero (step S165). When the number of broken samples is not zero, the process proceeds to step S171. Conversely, when the number of broken samples is zero, the process proceeds to step S175. In step S171, the control unit 37 determines whether the number variable R is equal to or less than the temporary variable P, i.e., the R-th sample is the broken sample which is not decoded normally (step S171). When the R-th sample is not the broken sample, the process proceeds to step S172. Conversely, when the R-th sample is the broken sample, the process proceeds to step S176. In step S172, the control unit 37 determines whether the temporary variable P is a negative value, i.e., the number of broken samples is unknown (step S172). When the number of broken samples is unknown, the process proceeds to step S173. Conversely, when the number of broken samples is not unknown, the process proceeds to step S175. In step S173, the control unit 37 substitutes the output tuning of the R-th sample in the output buffer 35 for the time variable X (step S173). Next, the control unit 37 determines whether the time variable X is less than t, i.e., the R-th sample is the previous sample of the decoding start picture (step S174). When the R-th sample is not the previous sample of the decoding start picture and the number of broken samples is zero or when the number of broken samples is not unknown and the R-th sample is not the broken sample, the R-th sample decoded by the decoding unit 34 is output from the output buffer 35 (step S175). Conversely, when the R-th sample is the broken sample or when the number of broken samples is unknown and the R-th sample is the previous sample of the decoding start picture, the output of the R-th sample is skipped and the process proceeds to step S176. Thereafter, the number variable R increases (step S176) and the process returns to step S164.

In the second example, the output of the samples which are not decoded normally among the previous samples of the decoding start picture is selectively skipped.

Figure 31:
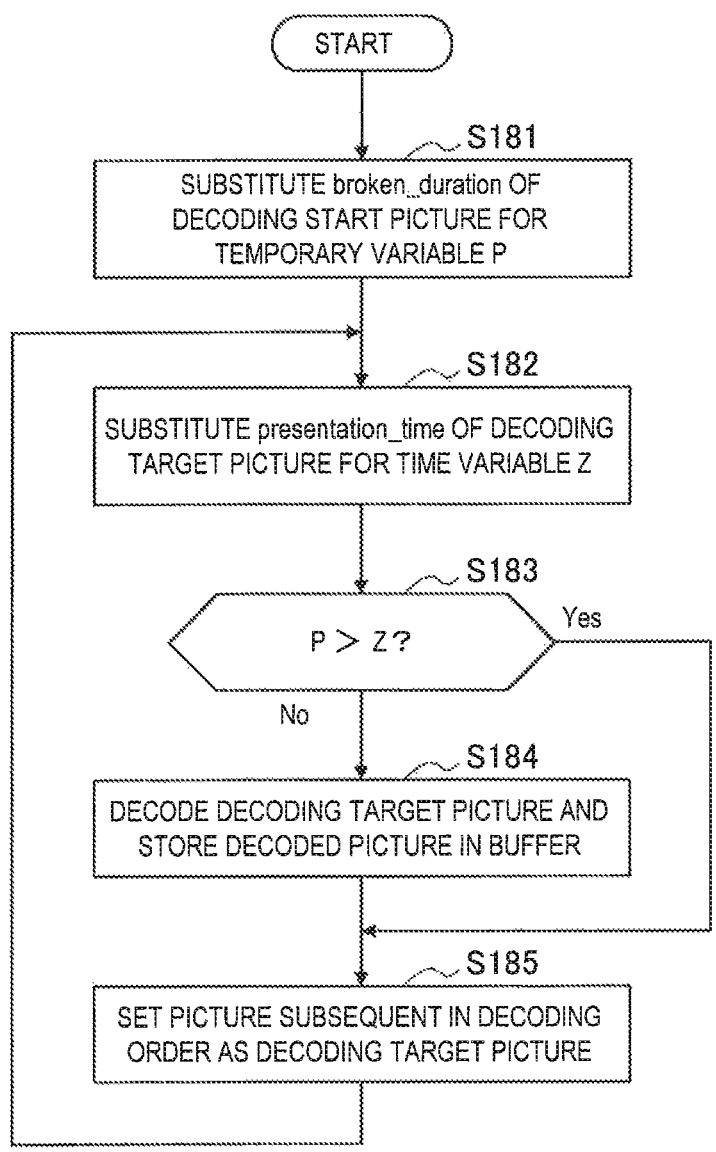
FIG. 31 is a flowchart illustrating a third example of the flow of a process of skipping output of a preceding picture which is not decoded normally.

In a third example of FIG. 31, the CRA information is assumed to include the broken time duration (broken_duration) for each CRA picture. First, the control unit 37 substitutes the broken time duration of the decoding start picture for the temporary variable P (step S181). Next, the control unit 37 substitutes the output timing (presentation_time) of one decoding target picture for a time variable Z (step S182).

Next, the control unit 37 determines whether the temporary variable P is greater than the time variable Z, i.e., the output timing of the decoding target picture has passed the broken time duration (step S183). When the output timing of the decoding target picture has passed the broken time duration, the decoding unit 34 decodes the decoding target picture and stores the decoded picture in the output buffer 35 (step S184). When the output timing of the decoding target picture has not passed the broken time duration, the decoding of the picture is skipped. Thereafter, a picture subsequent in the decoding order is set as the decoding target picture and the process returns to step S182.

[4-2. Decoding Process for Fragmented Movie]
(1) Overall Flow

Figure 32:
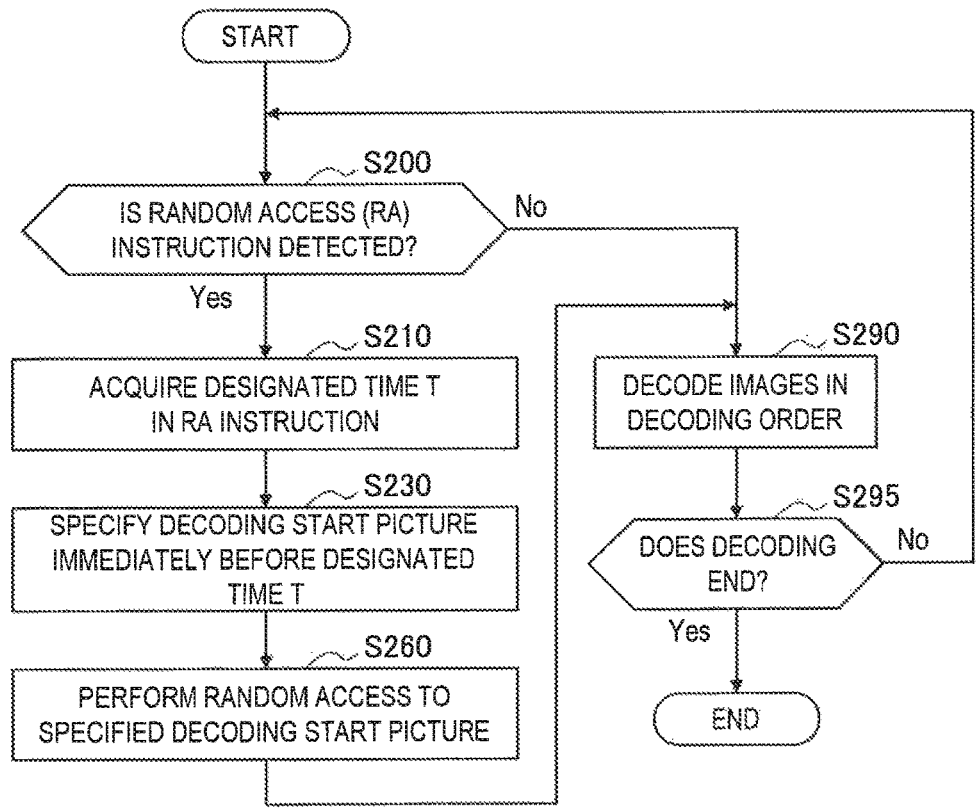
FIG. 32 is a flowchart illustrating a second example of the flow of the decoding process performed by the device exemplified in FIG. 24.

FIG. 32 is a flowchart illustrating a second example of the flow of the decoding process performed by the image decoding device 30 exemplified in FIG. 24. The second example is associated with decoding of an image sequence that has the Fragmented Movie structure.

In the decoding process exemplified in FIG. 32, the control unit 37 continuously monitors a random access (RA) instruction (step S200). When the RA instruction is detected, processes of steps S210 to S260 are performed. When no RA instruction is detected, the decoding unit 34 decodes the images in the decoding order (step S290).

When the RA instruction is detected, the control unit 37 acquires a designated time T indicating a designated timing in the RA instruction (step S210). Next, the control unit 37 retrieves the randomly accessible picture immediately before the designated time T based on the CRA information and specifies the decoding start picture (step S230). The decoding start picture specified herein is the CRA picture or the IDR picture. Next, the decoding unit 34 performs the random access to the decoding start picture specified by the control unit 37 (step S260). Then, the decoding unit 34 decodes the images from the decoding start picture in the decoding order (step S290).

The above-described processes are repeated until an instruction to end the decoding or until the final image is decoded (step S295).

(2) Specifying Decoding Start Picture

Figure 33:
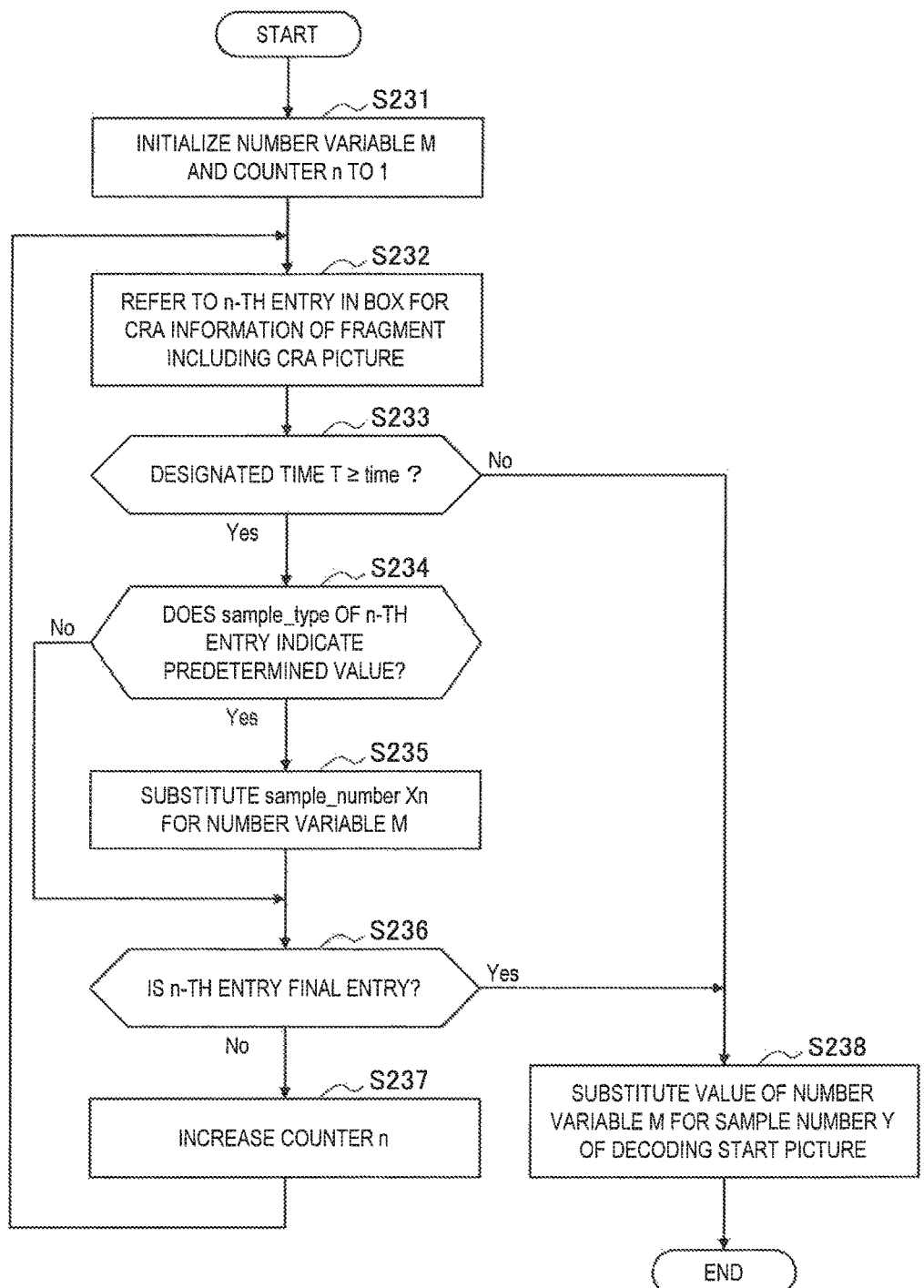
FIG. 33 is a flowchart illustrating a third example of the flow of the process of specifying the decoding start picture.

FIG. 33 is a flowchart illustrating an example of the flow of the process corresponding to step S230 of FIG. 32 and performed to specify the decoding start picture. In the example of FIG. 33, the CRA information is assumed to be stored in the tfca box exemplified in FIGS. 10 to 12 and the tfr2 box exemplified in FIGS. 13 to 15.

Referring to FIG. 33, the control unit 37 first initializes a number variable M and the counter n to 1 (step S231). Next, the control unit 37 refers to an n-th entry in the sample box for the CRA information of the fragment including the CRA picture (step S232). Next, the control unit 37 determines whether the output timing (time) of the n-th entry is equal to or less than the designated time T (step S234). Here, when the output timing of the n-th entry is not equal to or less than the designated time T, the process proceeds to step S238. Conversely, when the output timing of the n-th entry is equal to or less than the designated time T, the process proceeds to step S234. In step S234, the control unit 37 determines whether the sample type (sample_type) of the n-th entry indicates a predetermined value (for example, the value of the NAL unit type indicating the CRA picture or the IDR picture (step S234). When the sample box for the CRA information does not include the sample type, the determination is omitted herein. When the sample type of the n-th entry does not indicate the predetermined value, the subsequent process of step S234 is skipped and the process proceeds to step S236. When the sample type of the n-th entry indicates the predetermined value, the control unit 37 substitutes the sample number (sample_number) Xn for the number variable M (step S235). Next, the control unit 37 determines whether the n-th entry is the final entry (step S236). When the n-th entry is not the final entry, the control unit 37 increases the counter n (step S237) and the process returns to step S232. When the n-th entry is the final entry, the process proceeds to step S238. In step S238, the control unit 37 substitutes the value of the number variable M for the sample number Y of the decoding start picture (step S238). When the sample box for the CRA information is defined separately from the sample box for the IDR information, the same process as that of FIG. 33 may be further performed on the sample box for the IDR information. In this case, the sample number Y of the decoding start picture having the output timing closer to the designated time T can be adopted.

When the CRA information is the sample group information grouping the CRA picture exemplified in FIGS. 18 to 23, the sample number Y of the decoding start picture may also be specified for a Fragmented Movie, as in the case of a Non-Fragmented Movie exemplified in FIG. 28.

When proceeding from step S260 of FIG. 32 to step S290, the process of skipping the output of the previous pictures which are not decoded normally may be the same as the processes exemplified in FIGS. 29 to 31.

5. EXAMPLE APPLICATION

The image encoding device 10 and the image decoding device 30 according to the embodiments described above may be applied to various electronic appliances such as a transmitter and a receiver for satellite broadcasting, cable broadcasting such as cable TV, distribution on the Internet, distribution to terminals via cellular communication, and the like, a recording device that records images in a medium such as an optical disc, a magnetic disk or a flash memory, a reproduction device that reproduces images from such storage medium, and the like. Four example applications will be described below.

5-1. First Application Example

Figure 34:
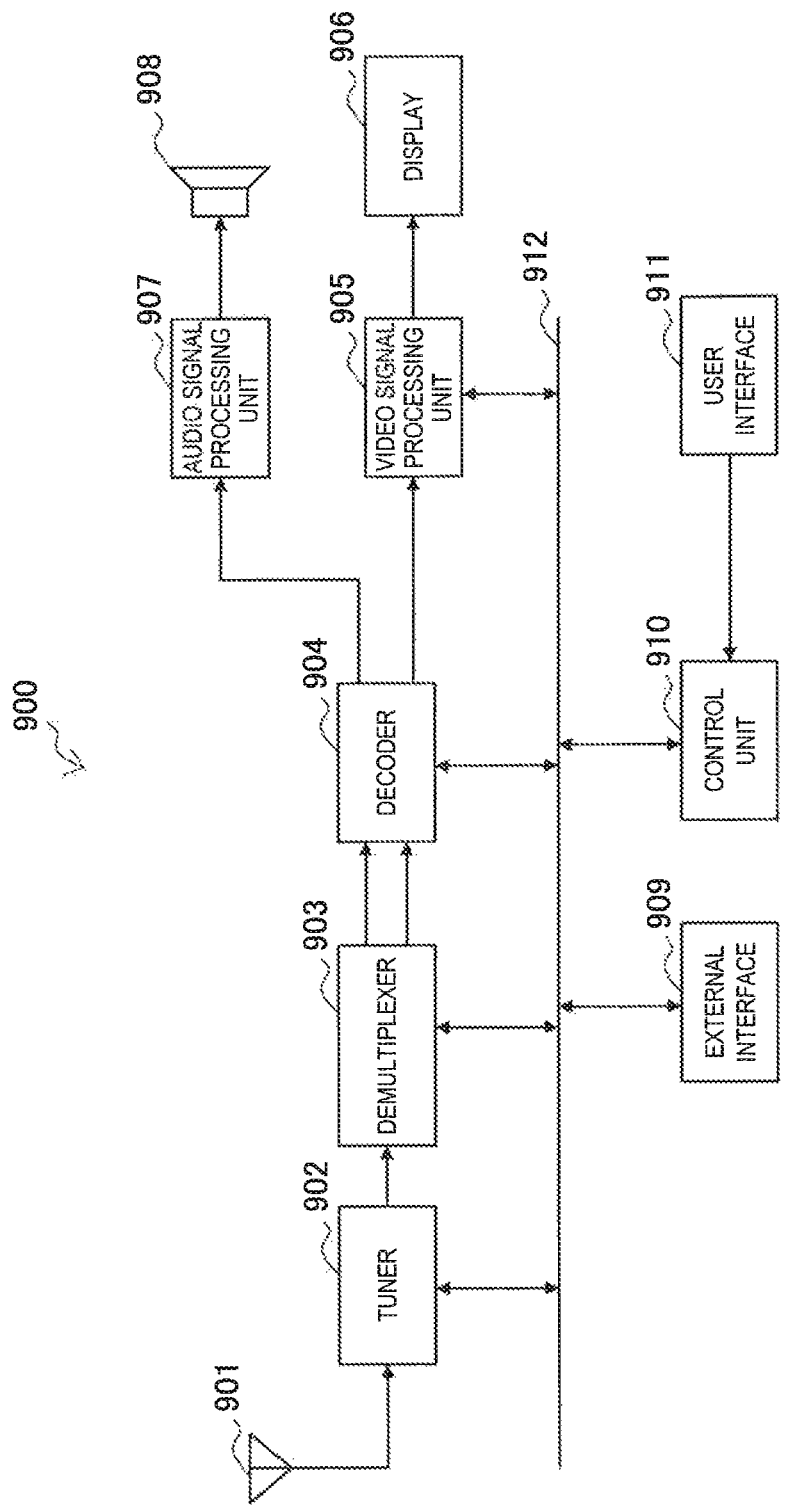
FIG. 34 is a block diagram showing an example of a schematic configuration of a television.

FIG. 34 illustrates an example of a schematic configuration of a television device applying the aforementioned embodiments. A television device 900 includes an antenna 901, a tuner 902, a demultiplexer 903, a decoder 904, a video signal processing unit 905, a display 906, an audio signal processing unit 907, a speaker 908, an external interface 909, a control unit 910, a user interface 911, and a bus 912.

The tuner 902 extracts a signal of a desired channel from a broadcast signal received through the antenna 901 and demodulates the extracted signal. The tuner 902 then outputs an encoded bit stream obtained by the demodulation to the demultiplexer 903. That is, the tuner 902 has a role as transmission means receiving the encoded stream in which an image is encoded, in the television device 900.

The demultiplexer 903 isolates a video stream and an audio stream in a program to be viewed from the encoded bit stream and outputs each of the isolated streams to the decoder 904. The demultiplexer 903 also extracts auxiliary data such as an EPG (Electronic Program Guide) from the encoded bit stream and supplies the extracted data to the control unit 910. Here, the demultiplexer 903 may descramble the encoded bit stream when it is scrambled.

The decoder 904 decodes the video stream and the audio stream that are input from the demultiplexer 903. The decoder 904 then outputs video data generated by the decoding process to the video signal processing unit 905. Furthermore, the decoder 904 outputs audio data generated by the decoding process to the audio signal processing unit 907.

The video signal processing unit 905 reproduces the video data input from the decoder 904 and displays the video on the display 906. The video signal processing unit 905 may also display an application screen supplied through the network on the display 906. The video signal processing unit 905 may further perform an additional process such as noise reduction on the video data according to the setting. Furthermore, the video signal processing unit 905 may generate an image of a GUI (Graphical User Interface) such as a menu, a button, or a cursor and superpose the generated image onto the output image.

The display 906 is driven by a drive signal supplied from the video signal processing unit 905 and displays video or an image on a video screen of a display device (such as a liquid crystal display, a plasma display, or an GELD (Organic ElectroLuminescence Display)).

The audio signal processing unit 907 performs a reproducing process such as D/A conversion and amplification on the audio data input from the decoder 904 and outputs the audio from the speaker 908. The audio signal processing unit 907 may also perform an additional process such as noise reduction on the audio data.

The external interface 909 is an interface that connects the television device 900 with an external device or a network. For example, the decoder 904 may decode a video stream or an audio stream received through the external interface 909. This means that the external interface 909 also has a role as the transmission means receiving the encoded stream in which an image is encoded, in the television device 900.

The control unit 910 includes a processor such as a Central Processing Unit (CPU) and a memory such as a RAM and a ROM. The memory stores a program executed by the CPU, program data, EPG data, and data acquired through the network. The program stored in the memory is read by the CPU at the start-up of the television device 900 and executed, for example. By executing the program, the CPU controls the operation of the television device 900 in accordance with an operation signal that is input from the user interface 911, for example.

The user interface 911 is connected to the control unit 910. The user interface 911 includes a button and a switch for a user to operate the television device 900 as well as a reception part which receives a remote control signal, for example. The user interface 911 detects a user operation through these components, generates the operation signal, and outputs the generated operation signal to the control unit 910.

The bus 912 mutually connects the tuner 902, the demultiplexer 903, the decoder 904, the video signal processing unit 905, the audio signal processing unit 907, the external interface 909, and the control unit 910.

In the television device 900 having the above-described configuration, the decoder 904 has the function of the image decoding device 30 according to the above-described embodiment. Accordingly, in the television device 900, the random access to the CRA picture can be performed simply based on the above-described CRA information.

5-2. Second Application Example

Figure 35:
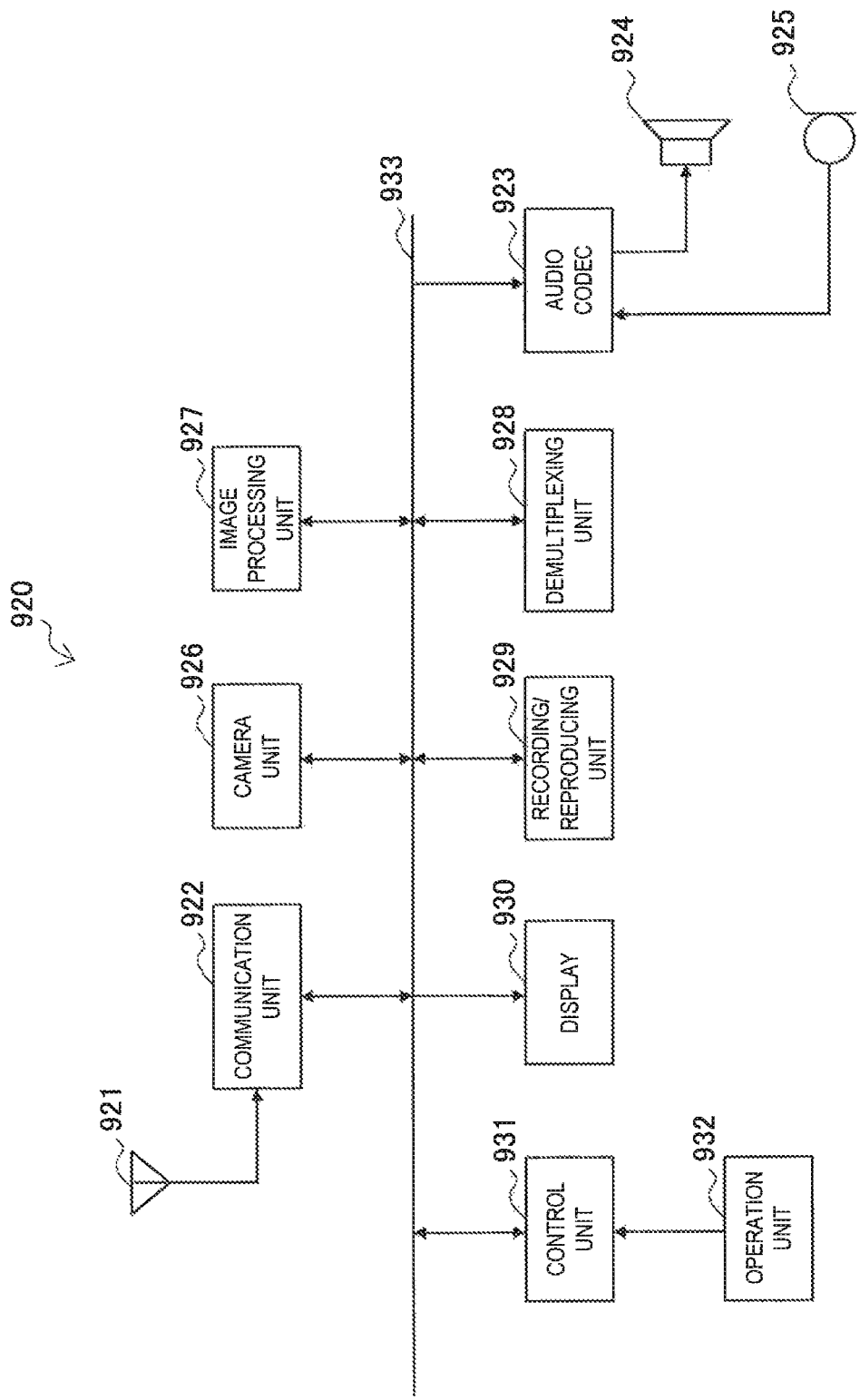
FIG. 35 is a block diagram showing an example of a schematic configuration of a mobile phone.

FIG. 35 illustrates an example of a schematic configuration of a mobile telephone applying the aforementioned embodiments. A mobile telephone 920 includes an antenna 921, a communication unit 922, an audio codec 923, a speaker 924, a microphone 925, a camera unit 926, an image processing unit 927, a demultiplexing unit 928, a recording/reproducing unit 929, a display 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the demultiplexing unit 928, the recording/reproducing unit 929, the display 930, and the control unit 931.

The mobile telephone 920 performs an operation such as transmitting/receiving an audio signal, transmitting/receiving an electronic mail or image data, imaging an image, or recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, converts a frequency of the signal, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then outputs the audio by supplying the generated audio signal to the speaker 924.

In the data communication mode, for example, the control unit 931 generates character data configuring an electronic mail, in accordance with a user operation through the operation unit 932. The control unit 931 further displays a character on the display 930. Moreover, the control unit 931 generates electronic mail data in accordance with a transmission instruction from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, converts a frequency of the signal, and acquires a reception signal. The communication unit 922 thereafter demodulates and decodes the reception signal, restores the electronic mail data, and outputs the restored electronic mail data to the control unit 931. The control unit 931 displays the content of the electronic mail on the display 930 as well as stores the electronic mail data in a storage medium of the recording/reproducing unit 929.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB (Unallocated Space Bitmap) memory, or a memory card.

In the photography mode, for example, the camera unit 926 images an object, generates image data, and outputs the generated image data to the image processing unit 927. The image processing unit 927 encodes the image data input from the camera unit 926 and stores an encoded stream in the storage medium of the recording/reproducing unit 929.

In the videophone mode, for example, the demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 subsequently transmits the generated transmission signal to the base station (not shown) through the antenna 921. Moreover, the communication unit 922 amplifies a radio signal received through the antenna 921, converts a frequency of the signal, and acquires a reception signal. The transmission signal and the reception signal can include an encoded bit stream. Then, the communication unit 922 demodulates and decodes the reception signal to restore the stream, and outputs the restored stream to the de-multiplexing unit 928. The demultiplexing unit 928 isolates the video stream and the audio stream from the input stream and outputs the video stream and the audio stream to the image processing unit 927 and the audio codec 923, respectively. The image processing unit 927 decodes the video stream to generate video data. The video data is then supplied to the display 930, which displays a series of images. The audio codec 923 expands and performs D/A conversion on the audio stream to generate an analog audio signal. The audio codec 923 then supplies the generated audio signal to the speaker 924 to output the audio.

In the mobile telephone 920 having the above-described configuration, the image processing unit 927 has the functions of the image encoding device 10 and the image decoding device 30 according to the above-described embodiment. Accordingly, in the mobile telephone 920 or a device decoding an image encoded in the mobile telephone 920, the random access to the CRA picture can be performed simply based on the above-described CRA information.

5-3. Third Application Example

Figure 36:
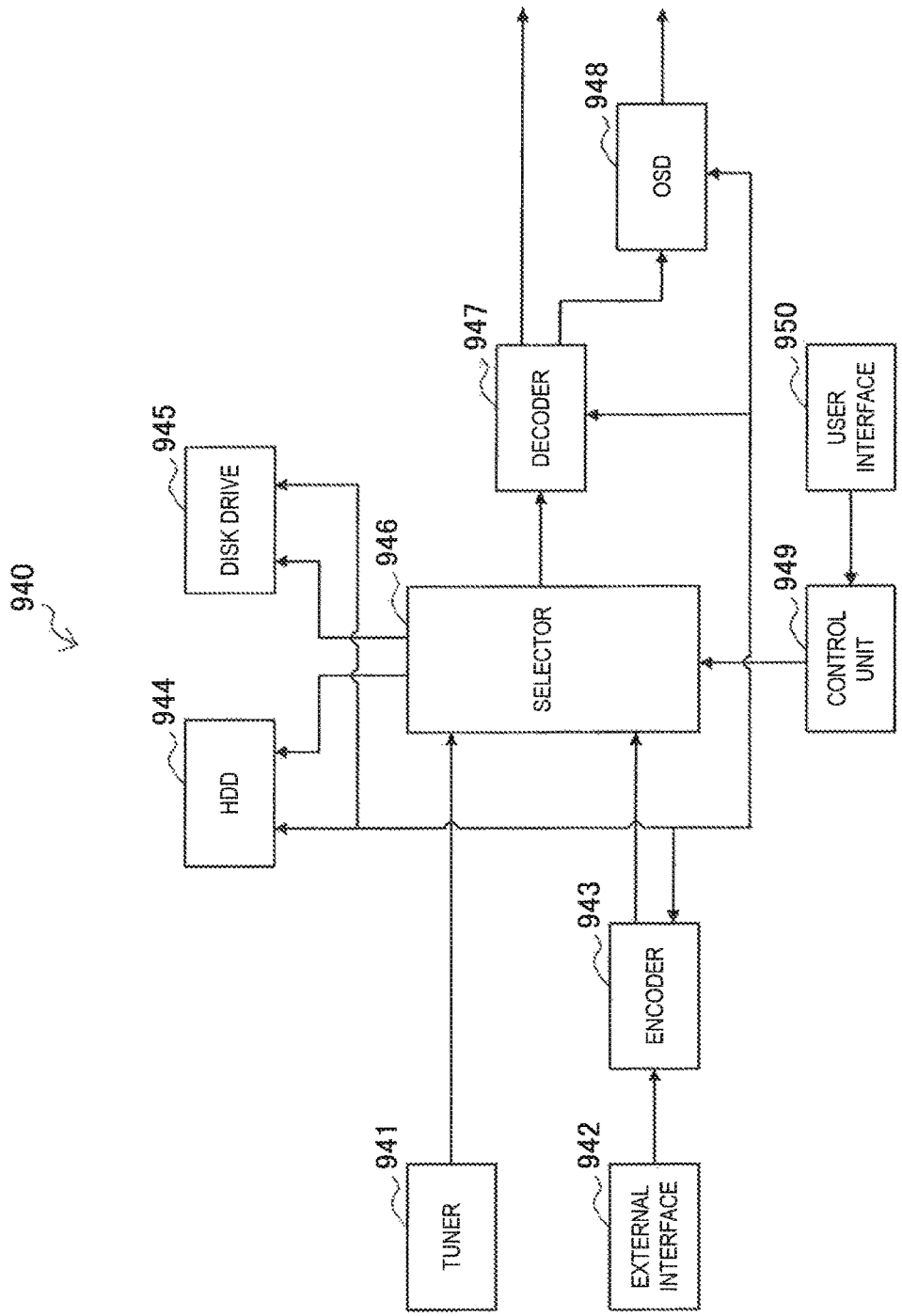
FIG. 36 is a block diagram showing an example of a schematic configuration of a recording/reproduction device.

FIG. 36 illustrates an example of a schematic configuration of a recording/reproducing device applying the aforementioned embodiments. A recording/reproducing device 940 encodes audio data and video data of a broadcast program received and records the data into a recording medium, for example. The recording/reproducing device 940 may also encode audio data and video data acquired from another device and record the data into the recording medium, for example. In response to a user instruction, for example, the recording/reproducing device 940 reproduces the data recorded in the recording medium on a monitor and a speaker. The recording/reproducing device 940 at this time decodes the audio data and the video data.

The recording/reproducing device 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface which connects the recording/reproducing device 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing device 940.

The encoder 943 encodes the video data and the audio data when the video data and the audio data input from the external interface 942 are not encoded. The encoder 943 thereafter outputs an encoded hit stream to the selector 946.

The HDD 944 records, into an internal hard disk, the encoded bit stream in which content data such as video and audio is compressed, various programs, and other data. The HDD 944 reads these data from the hard disk when reproducing the video and the audio.

The disk drive 945 records and reads data into/from a recording medium which is mounted to the disk drive. The recording medium mounted to the disk drive 945 may be, for example, a DVD disk (such as DVD-Video, DVD-RAM, DVD-R, DVD-RW, DVD+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded hit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, a button, or a cursor onto the video displayed.

The control unit 949 includes a processor such as a CPU and a memory such as a RAM and a ROM. The memory stores a program executed by the CPU as well as program data. The program stored in the memory is read by the CPU at the start-up of the recording/reproducing device 940 and executed, for example. By executing the program, the CPU controls the operation of the recording/reproducing device 940 in accordance with an operation signal that is input from the user interface 950, for example.

The user interface 950 is connected to the control unit 949. The user interface 950 includes a button and a switch for a user to operate the recording/reproducing device 940 as well as a reception part which receives a remote control signal, for example. The user interface 950 detects a user operation through these components, generates the operation signal, and outputs the generated operation signal to the control unit 949.

In the recording/reproducing device 940 having the above-described configuration, the encoder 943 has the function of the image encoding device 10 according to the above-described embodiment. The decoder 947 has the function of the image decoding device 30 according to the above-described embodiment. Accordingly, in the recording/reproducing device 940 or a device decoding an image decoded in the recording/reproducing device 940, the random access to the CRA picture can be performed simply based on the above-described CRA information.

5-4. Fourth Application Example

Figure 37:
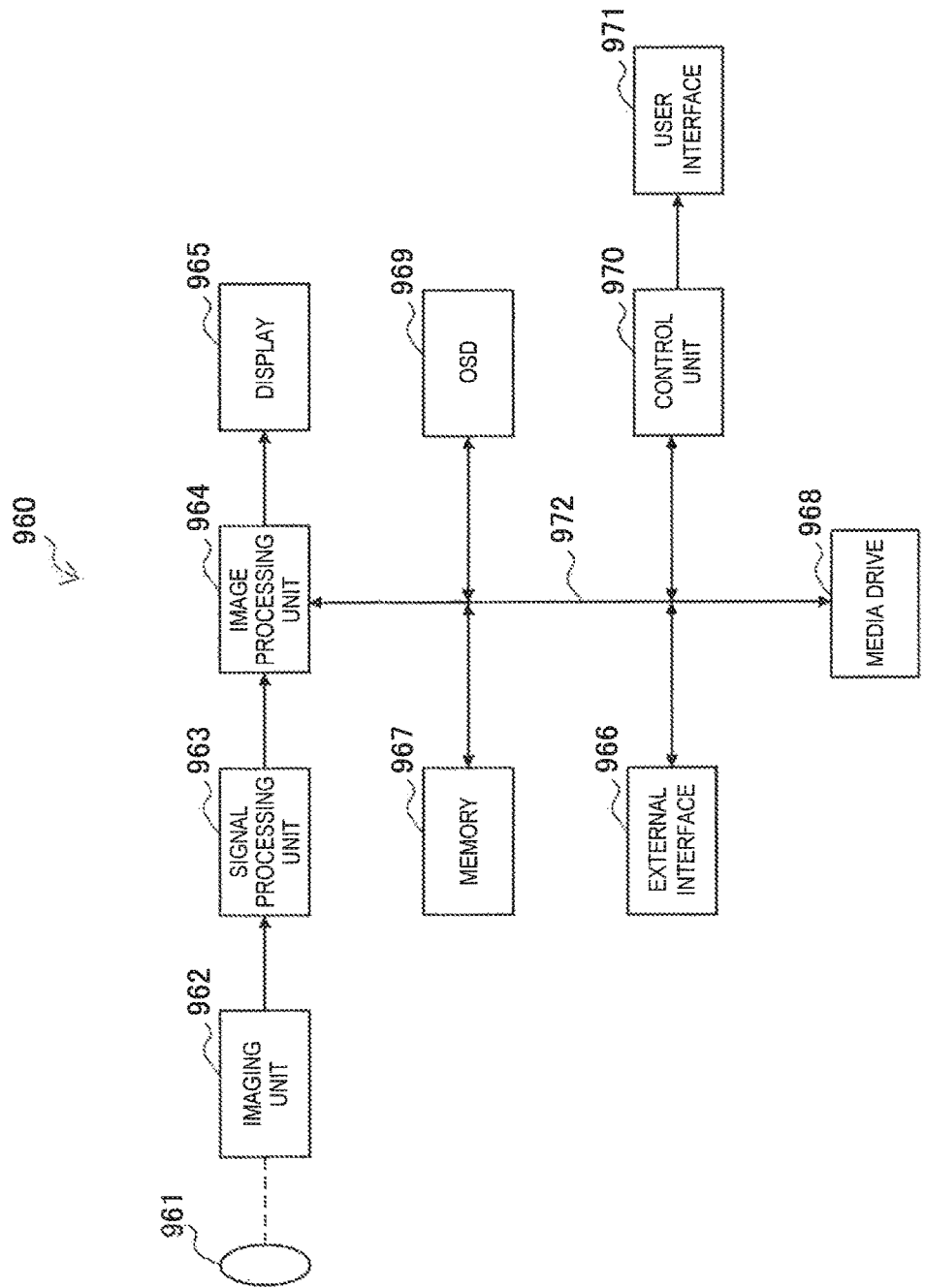
FIG. 37 is a block diagram showing an example of a schematic configuration of an image capturing device.

FIG. 37 shows an example of a schematic configuration of an image capturing device applying the aforementioned embodiments. An imaging device 960 images an object, generates an image, encodes image data, and records the data into a recording medium.

The imaging device 960 includes an optical block 961, an imaging unit 962, a signal processing unit 963, an image processing unit 964, a display 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of the object on an imaging surface of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging surface into an image signal as an electric signal. Subsequently, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal process has been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display 965. Moreover, the image processing unit 964 may output to the display 965 the image data input from the signal processing unit 963 to display the image. Furthermore, the image processing unit 964 may superpose display data acquired from the OSD 969 onto the image that is output on the display 965.

The OSD 969 generates an image of a GUI such as a menu, a button, or a cursor and outputs the generated image to the image processing unit 964.

The external interface 966 is configured as a USB input/output terminal, for example. The external interface 966 connects the imaging device 960 with a printer when printing an image, for example. Moreover, a drive is connected to the external interface 966 as needed. A removable medium such as a magnetic disk or an optical disk is mounted to the drive, for example, so that a program read from the removable medium can be installed to the imaging device 960. The external interface 966 may also be configured as a network interface that is connected to a network such as a LAN or the Internet. That is, the external interface 966 has a role as transmission means in the imaging device 960.

The recording medium mounted to the media drive 968 may be an arbitrary removable medium that is readable and writable such as a magnetic disk, a magneto-optical disk, an optical disk, or a semiconductor memory. Furthermore, the recording medium may be fixedly mounted to the media drive 968 so that a non-transportable storage unit such as a built-in hard disk drive or an SSD (Solid State Drive) is configured, for example.

The control unit 970 includes a processor such as a CPU and a memory such as a RAM and a ROM. The memory stores a program executed by the CPU as well as program data. The program stored in the memory is read by the CPU at the start-up of the imaging device 960 and then executed. By executing the program, the CPU controls the operation of the imaging device 960 in accordance with an operation signal that is input from the user interface 971, for example.

The user interface 971 is connected to the control unit 970. The user interface 971 includes a button and a switch for a user to operate the imaging device 960, for example. The user interface 971 detects a user operation through these components, generates the operation signal, and outputs the generated operation signal to the control unit 970.

In the imaging device 960 having the above-described configuration, the image processing unit 964 has the functions of the image encoding device 10 and the image decoding device 30 according to the above-described embodiment. Accordingly, in a device decoding an image captured and encoded in the imaging device 960, the random access to the CRA picture can be simply performed based on the above-described CRA information.

6. CONCLUSION

Various embodiments of the technology in the present disclosure have been described in detail above with reference to FIGS. 1 to 37. According to the above-described embodiments, the CRA information used to identify the CRA picture usable as the decoding start picture at the time of random access is inserted into the header region of the file format. Accordingly, the decoder can simply realize the random access to the CRA picture without examination of the NAL unit type assigned to the image data in the data region across a series of image data.

In a certain embodiment, the CRA information can be formed by grouping the CRA pictures by utilizing the structure of the sample group with the NAL format. In this configuration, since the decoder does not handle a new sample box, it is possible to extend the known decoder at a lower cost and realize the random access based on the CRA information.

In another embodiment, by extending the sample box with the MP4 format, it is possible to form an extended sample box storing the CPA information. In this configuration, various kinds of information such as the sample number of each CRA picture and the previous picture information which is not decoded normally can be included in the extended sample box. The extended sample box may be a dedicated box for the CRA information. In this case, a decoder which does not support the random access to the CRA picture may simply ignore the dedicated box. Accordingly, the disadvantage caused due to introduction of the extended sample box does not occur. The extended sample box may be a shared box for the IDR information and the CRA information. In this case, the decoder can mount a comprehensive structure for the random access to the IDR picture and the CRA picture merely referring to only the shared box.

The CRA information can include previous picture information used to identify the previous picture which precedes each CRA picture in the presentation order and is not decoded normally at the time of the random access to the CRA picture. Since the IDR picture does not include such a previous picture, the previous picture information can be generated only for the CRA picture. In this configuration the decoder may not determine later whether the previous picture is decoded normally at the time of the random access, and a broken image can be prevented from being displayed on a display or output to an external processor based on the previous picture information.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

Additionally, the present technology may also be configured as below.

(1)

An image decoding device including:

an acquisition unit configured to acquire clean random access (CRA) information used to identify one or more CRA pictures in an image sequence inserted into a data region from a header region of a file format including the header region and the data region;

a control unit configured to specify one CRA picture in the image sequence as a decoding start picture using the CRA information when an instruction of random access is detected; and a decoding unit configured to decode the image sequence from the decoding start picture specified by the control unit.

(2)

The image decoding device according to (1), wherein the file format is an MP4 format, and wherein the CRA information is sample group information grouping the one or more CRA pictures.

(3)

The image decoding device according to (1), wherein the file format is an MP4 format, and wherein the acquisition unit acquires the CRA information from an expanded sample box expanded to store the CRA information.

(4)

The image decoding device according to (3), wherein the expanded sample box is a box further including instantaneous decoding refresh (IDR) information used to identify an IDR picture.

(5)

The image decoding device according to (3), wherein the expanded sample box is a box defined separately from a box including IDR information used to identify an IDR picture.

(6)

The image decoding device according to any one of (2) to (5), wherein the CRA information includes previous picture information used to identify a previous picture which is previous to each CRA picture in a presentation order and is not decoded normally at a time of random access to the CRA picture, and wherein the control unit skips output of the previous picture from the image decoding device based on the previous picture information.

(7)

The image decoding device according to (6), wherein the previous picture information indicates the number of previous pictures for each CRA pictures.

(8)

The image decoding device according to (6), wherein the previous picture information indicates a time duration corresponding to the previous picture for each CRA picture.

(9)

The image decoding device according to any one of (1) to (8), wherein the control unit specifies a CRA picture located closest to a timing designated in the instruction of the random access as the decoding start picture based on the CRA information.

(10)

An image decoding method including:

acquiring clean random access (CRA) information used to identify one or more CRA pictures in an image sequence inserted into a data region from a header region of a file format including the header region and the data region;

specifying one CRA picture in the image sequence as a decoding start picture using the CRA information when an instruction of random access is detected; and decoding the image sequence from the specified decoding start picture.

(11)

An image encoding device including:

an encoding unit configured to encode an image in an image sequence and generate image data;

a determination unit configured to determine one or more clean random access (CRA) pictures usable as a decoding start picture at a time of random access in the image sequence; and a file generation unit configured to insert CRA information used to identify the one or more CRA pictures determined by the determination unit into a header region of a file format including the header region and a data region and to insert the image data into the data region.

(12) The image encoding device according to (11), wherein the file format is an MP4 format, and wherein the CRA information is sample group information grouping the one or more CRA pictures.

(13) The image encoding device according to (11), wherein the file format is an MP4 format, and wherein the file generation unit stores the CRA information in an expanded sample box expanded to store the CRA information.

(14) The image encoding device according to (13), wherein the file generation unit further stores instantaneous decoding refresh (IDR) information used to identify an IDR picture in the expanded sample box.

(15) The image encoding device according to (13), the expanded sample box is a box defined separately from a box in which IDR information used to identify an IDR picture is stored.

(16) The image encoding device according to any one of (12) to (15), wherein the determination unit further determines a previous picture which is previous to each CRA picture in a presentation order and is not decoded normally at a time of random access to the CRA picture, and wherein the file generation unit includes previous picture information used to identify the previous picture of each CRA picture determined by the determination unit in the CRA information.

(17) The image decoding device according to (16), wherein the previous picture information indicates the number of previous pictures for each CRA pictures.

(18) The image decoding device according to (16), wherein the previous picture information indicates a time duration corresponding to the previous picture for each CRA picture.

(19) An image encoding method including:
encoding an image in an image sequence and generating image data;
determining one or more clean random access (CRA) pictures usable as a decoding start picture at a time of random access in the image sequence; and
inserting CRA information used to identify the determined one or more CRA pictures into a header region of a file format including the header region and a data region; and
inserting the image data into the data region.

REFERENCE SIGNS LIST 10 image encoding device
11 encoding unit
12 determination unit
15 file generation unit
16 control unit
20 moving image file
21 header region
27 data region
30 image decoding device
34 decoding unit
36 CRA information acquisition unit
37 control unit

The invention claimed is:

1. An image decoding device comprising:
a decoding unit configured to decode an image based on clean random access (CRA) information, which identifies CRA pictures in the image and which is set in a header region of a file that includes the header region and a data region within which a series of encoded image data associated with actual data of the image is stored,
wherein the file is an MP4 format file,
wherein the CRA information is sample group information grouping a plurality of CRA pictures,
wherein the CRA information includes previous picture information used to identify a previous picture which is previous to each CRA picture in a presentation order and is not decoded normally at a time of random access to the CRA picture,
wherein output of the previous picture from the image decoding device is skipped based on the previous picture information, and
wherein the decoding unit is implemented via at least one processor.

2. The image decoding device according to claim 1, wherein the CRA information is acquired from an expanded sample box expanded to store the CRA information.

3. The image decoding device according to claim 2, wherein the expanded sample box is a box further including instantaneous decoding refresh (IDR) information used to identify an IDR picture.

4. The image decoding device according to claim 2, wherein the expanded sample box is a box defined separately from a box including IDR information used to identify an IDR picture.

5. The image decoding device according to claim 1, wherein the previous picture information indicates the number of previous pictures for each CRA picture.

6. The image decoding device according to claim 1, wherein the previous picture information indicates a time duration corresponding to the previous picture for each CRA picture.

7. The image decoding device according to claim 1, wherein a CRA picture located closest to a timing designated in an instruction of random access is specified as a decoding start picture based on the CRA information.

8. The image decoding device according to claim 1, wherein one CRA picture located at an intermediate position within a sequence of the CRA pictures in the image is specified as a decoding start picture.

9. The image decoding device according to claim 1, wherein the header region is a moov box in MP4 File Format and the data region is an mdat box in MP4 File Format.

10. The image decoding device according to claim 9, wherein the CRA information is set in a Sample Group Description Box of the moov box.

11. The image decoding device according to claim 10, wherein the CRA information is defined using VisualSampleGroupEntry class.

12. An image decoding method comprising:
decoding an image based on clean random access (CRA) information, which identifies CRA pictures in the image and which is set in a header region of a file that includes the header region and a data region within which a series of encoded image data associated with actual data of the image is stored, wherein the file is an MP4 format file,
wherein the CRA information is sample group information grouping a plurality of CRA pictures,
wherein the CRA information includes previous picture information used to identify a previous picture which is previous to each CRA picture in a presentation order and is not decoded normally at a time of random access to the CRA picture, and
wherein output of the previous picture from the image decoding is skipped based on the previous picture information.

13. The image decoding method according to claim 12, wherein the header region is a moov box in MP4 File Format and the data region is an mdat box in MP4 File Format.

14. The image decoding method according to claim 13, wherein the CRA information is set in a Sample Group Description Box of the moov box.

15. The image decoding method according to claim 14, wherein the CRA information is defined using VisualSampleGroupEntry class.

* * * * *